INVENTORS
J.W. HALINA
L.B. HAIGH
W.S. LITCHMAN
BY
ATTORNEY

NETWORK STATUS INTELLIGENCE ACQUISITION, ASSESSMENT AND COMMUNICATION

Filed March 17, 1965 12 Sheets-Sheet 3

| | 11 | 12 | 13 | 14 | 21 | 22 | 23 | 24 | 31 | 32 | 33 | 34 | 41 | 42 | 43 | 44 | $d^{ij}_{gh'}$ (1) | $C^{pr}_{ni}$ (2) | $N^{p}_{ijgh'}$ (3) |
|---|---|---|---|---|---|---|---|---|---|---|---|---|---|---|---|---|---|---|---|
| 11 | \ | 5-1 X | | | 5-1 X | | | | | | | | | | | | 5 | 2/3 | 2/75 |
| 12 | 4-1 X | \ | 4-1 X | | | 4-1 X | | | | | | | | | | | 4 | 1 | 1/16 |
| 13 | | 4-1 X | \ | 4-1 X | | | 4-1 X | | | | | | | | | | 4 | 1 | 1/16 |
| 14 | | | 5-1 X | \ | | | | 5-1 X | | | | | | | | | 5 | 2/3 | 2/75 |
| 21 | 4-1 X | | | | \ | 4-1 X | | | 4-1 X | | | | | | | | 4 | 1 | 1/16 |
| 22 | | 3-1 X | | | 3-1 X | \ | 3-1 X | | | 3-1 X | | | | | | | 3 | 4/3 | 4/27 |
| 23 | | | 3-1 X | | | 3-1 X | \ | 3-1 X | | | 3-1 X | | | | | | 3 | 4/3 | 4/27 |
| 24 | | | | | | | 4-1 X | \ | | | | 4-1 X | | | | | 4 | 1 | 1/16 |
| 31 | | | | | 3-1 X | | | | \ | 3-1 X | | | 3-1 X | | | | 3 | 1 | 1/9 |
| 32 | | | | | | 2-1 X | | | 2-1 X | \ | 2-1 X | | | 2-1 X | | | 2 | 4/3 | 1/3 |
| 33 | | | | | | | 2-1 X | | | 2-1 X | \ | 2-1 X | | | 2-1 X | | 2 | 4/3 | 1/3 |
| 34 | | | | | | | | | | | 3-1 X | \ | | | | 3-1 X | 3 | 1 | 1/9 |
| 41 | | | | | | | | | 2-1 X | | | | \ | 2-1 X | | | 2 | 2/3 | 1/6 |
| 42 | | | | | | | | | | 1-1 X | | | 0-1 X | \ | 0-1 X | | 1 | 1 | 1 |
| 43 | | | | | | | | | | | 1-1 X | | | 1-1 X | \ | 1-1 X | 1 | 1 | 1 |
| 44 | | | | | | | | | | | | 2-1 X | | | X | \ | 2 | 2/3 | 1/6 |
| ITERATION | | | | | | | | | | | | | | | X | | | | |
| 1 | +1 | +1 | +1 | +1 | +1 | +1 | +1 | +1 | +1 | +1 | +1 | +1 | +1 | -1 | -1 | +1 | | | |
| 2 | +1 | +1 | +1 | +1 | +1 | +1 | +1 | +1 | +1 | -1 | -1 | +1 | -1 | -1 | -1 | -1 | | | |
| 3 | +1 | +1 | +1 | +1 | +1 | -1 | -1 | +1 | -1 | -1 | -1 | -1 | -1 | -1 | -1 | -1 | | | |
| 4 | +1 | -1 | -1 | +1 | -1 | -1 | -1 | -1 | -1 | -1 | -1 | -1 | -1 | -1 | -1 | -1 | | | |
| 5 | -1 | -1 | -1 | -1 | -1 | -1 | -1 | -1 | -1 | -1 | -1 | -1 | -1 | -1 | -1 | -1 | | | |
| 6 | | | | | | | | | | | | | | | | | | | |
| 7 | | | | | | | | | | | | | | | | | | | |

CONNECTIVITY WEIGHTING COMPUTER 3,411,140

NETWORK STATUS INTELLIGENCE ACQUISITION, ASSESSMENT AND COMMUNICATION

Joseph W. Halina, Brussels, Belgium, Leslie B. Haigh, West Orange, N.J., and William S. Litchman, New York, N.Y., assignors to International Telephone and Telegraph Corporation, New York, N.Y., a corporation of Delaware Filed Mar. 17, 1965, Ser. No. 440,436
25 Claims. (Cl. 340—172.5)

ABSTRACT OF THE DISCLOSURE

A distributed switching network is provided for routing telephone and data signals over wide areas by the best available routes. The network includes a number of nodes at each of which automatic switching equipment makes a continuous assessment of the system based on assessment signals from adjacent nodes. Each node weights assessment signals received in accordance with pre-established criteria. Means are provided responsive to the assessment signals as weighted by each node to supply an optimum route through the network.

This invention relates to circuitry for acquiring, assessing, and communicating intelligence about the status of a network linking a plurality of points and more particularly to dynamic decision making equipment for establishing routes through degraded or saturated switching networks.

In its broader aspects, the invention should be viewed as a system for providing a statistical analysis of the status of node points and the communication links which interconnect such nodes. Normally, the system selects the links that give the shortest or best available route between two desired node points.

To facilitate its understanding, it will be convenient to describe the invention in connection with a telephone system which is widely scattered over a large geographical area. Then, the node points become telephone switching centers, and the links become the communication channels for interconnecting the centers. However, the node points could just as well be airports, and the links could be air lanes. Or, the nodes could be busy intersections, and the links could be highways or railroad tracks. In like manner, the invention may be applied to virtually any network of paths or routes carrying traffic which can be rerouted to avoid areas of congestion, degradation or other obstructions.

The reasons for the congestion, degradation, or obstruction are immaterial. In telephony, congestion may result from an unavailability of links or atmospheric disturbance. Usually in radio transmission, such unavailability results from a meteorological condition. In air lane traffic, the congestion could result from foul weather. In highway or railroad systems, the congestion could result from wrecks. In any of the systems, congestion could result from emergencies causing an excessive amount of traffic which saturates some switching or transmission links centers. Degradation could occur from partial destruction of the network. This could be gradual degradation—as when a traveling storm cuts a swatch; or it could be sudden—as when nuclear bombs explode.

The unfavorable consequences of these, or other switching network failures, may be avoided by providing automatic controls for rerouting traffic to avoid points of congestion, degradation or obstruction. A deceptively simple solution to the problem of acquiring data about the status of the links and nodes of a distributed network suggests the installation of a tallying device at some convenient central point in the network. Circuits are then extended from this point to status sensors associated with components of the network. At the central point, a computer is programmed to respond to collective reports and calculate the shortest or best available routes through such a network. Specified information which identifies such routes could then be provided on demand to each node of the network.

This "simple" solution suffers from a number of shortcomings. First, destruction or other failure of a centralized computer would result in failure of an entire network. In times of hostility such a failure offers an inducement for attack. Second, even a redundant duplication of computers results in a control system which is less reliable than the controlled network unless the number of redundant computers is increased to approach the number of the nodes in the network. This is entirely too expensive.

If the same technological art applies equally to the network and the controls, another solution is to duplicate the entire network by constructing a system of sensory and control circuits which are as reliable as the controlled network itself. Otherwise the control system would be more likely than the network to fail under conditions of degradation. Again, this is a very expensive proceeding.

Accordingly, an object of the invention is to provide a new and improved way of acquiring, assessing, and communicating intelligence about the status of a network. In this connection, an object is to provide a data reporting system which will continue to function to the extent that the network has survived a disaster.

Another object of this invention is to provide for acquiring, assessing and communicating data relative to the status of a network. More specifically, an object is to provide control so that the circuits imbedded in the links of the network computation functions are widely distributed. In this connection, an object is to provide a control network which is capable of its normal function whereby any network which may exist at any time to any degree, can continue in a condition of service.

Stated another way, an object is to provide a network status acquisition, assessment and communication system which utilizes the link transmission and nodal switching facilities of the network itself so that the controls continue to function with respect to any residually available network or networks so long as, in the process of degradation, any residue remains.

In keeping with an aspect of the invention, these and other objects are accomplished by a status assessment computer distributed throughout a switching network. The various computer components are interconnected by an order wire or channel which is assigned from among the wires or channels that link the network. The component of the distributed computer which is located at any given node (called the "local computer") receives information signals about the status of that node directly from sensors associated therewith. In addition, the local computer receives other information signals about the links which are not connected to the given node. After receiving these signals, the local computer weights them according to preestablished criteria to determine their credibility. When the status report resulting from the weighted signals appears to warrant a particular decision, within a given probability factor, the computer causes the switching network to undertake an appropriate rerouting or other direction of traffic.

Throughout the remainder of this specification, it will be convenient to refer to the sensors and the order wire as the "sensor system." The network for disseminating rerouting information is called the "directory system." Each of these system is a fan-shaped network spreading from its apex at the local node into the controlled network.

The above mentioned and other features and objects of this invention and the manner of obtaining them will become more apparent, and the invention itself will be best understood by reference to the following description of an embodiment of the invention taken in conjunction with the accompanying drawings, in which.

Figure 8A:
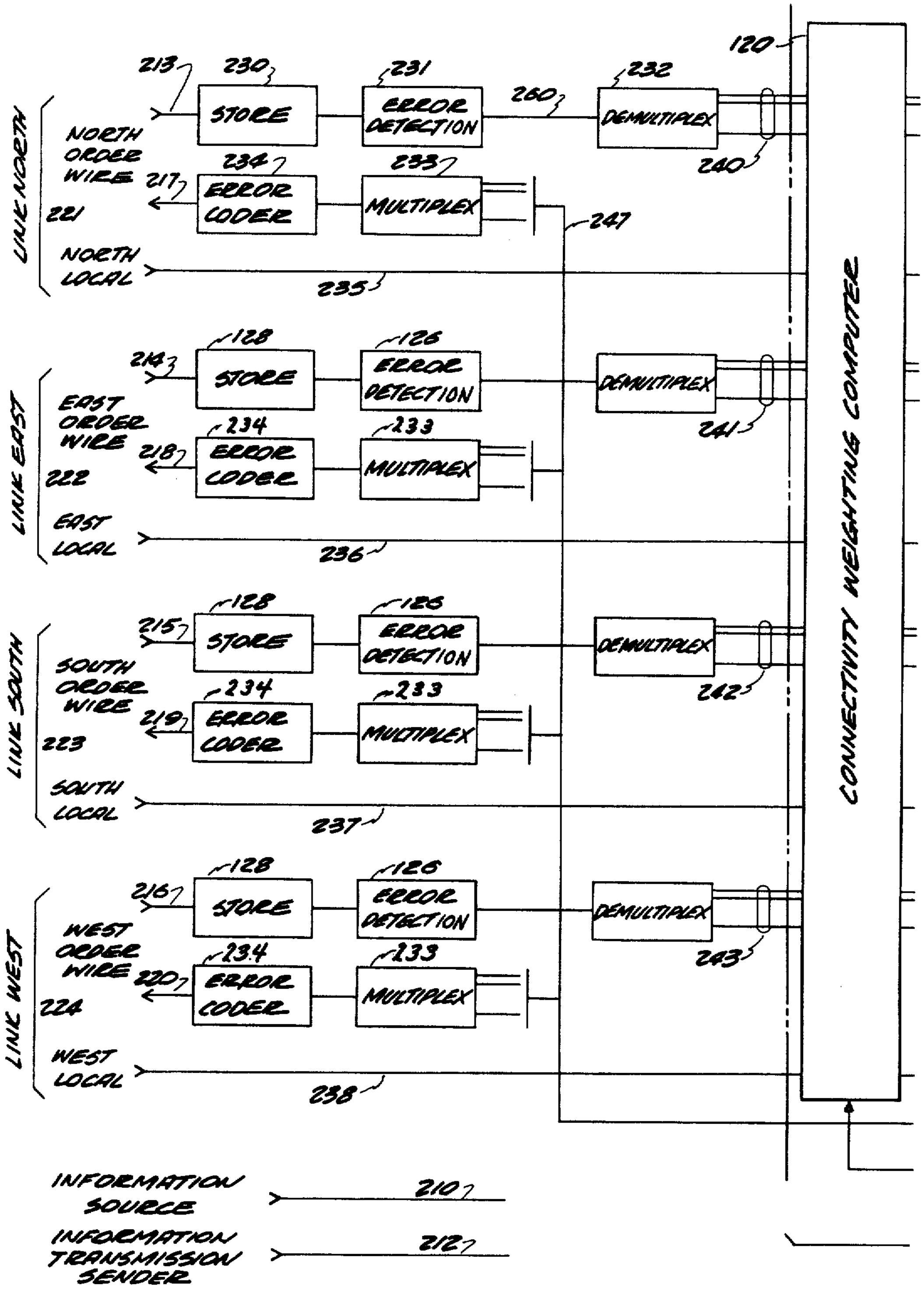
Figure 8B:
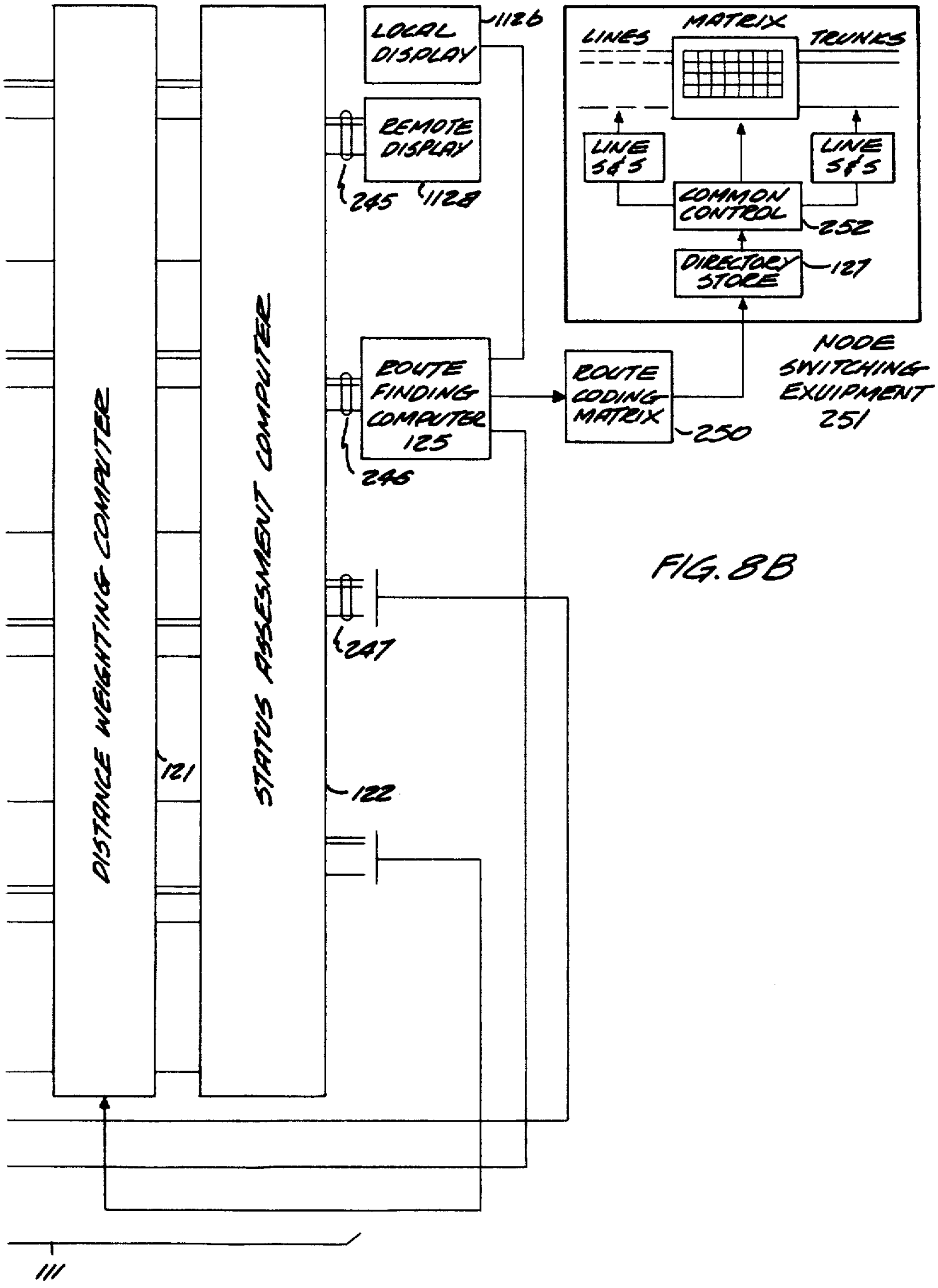

FIGS. 8A and 8B form a block diagram of an embodiment of the invention; and

Figure 2:
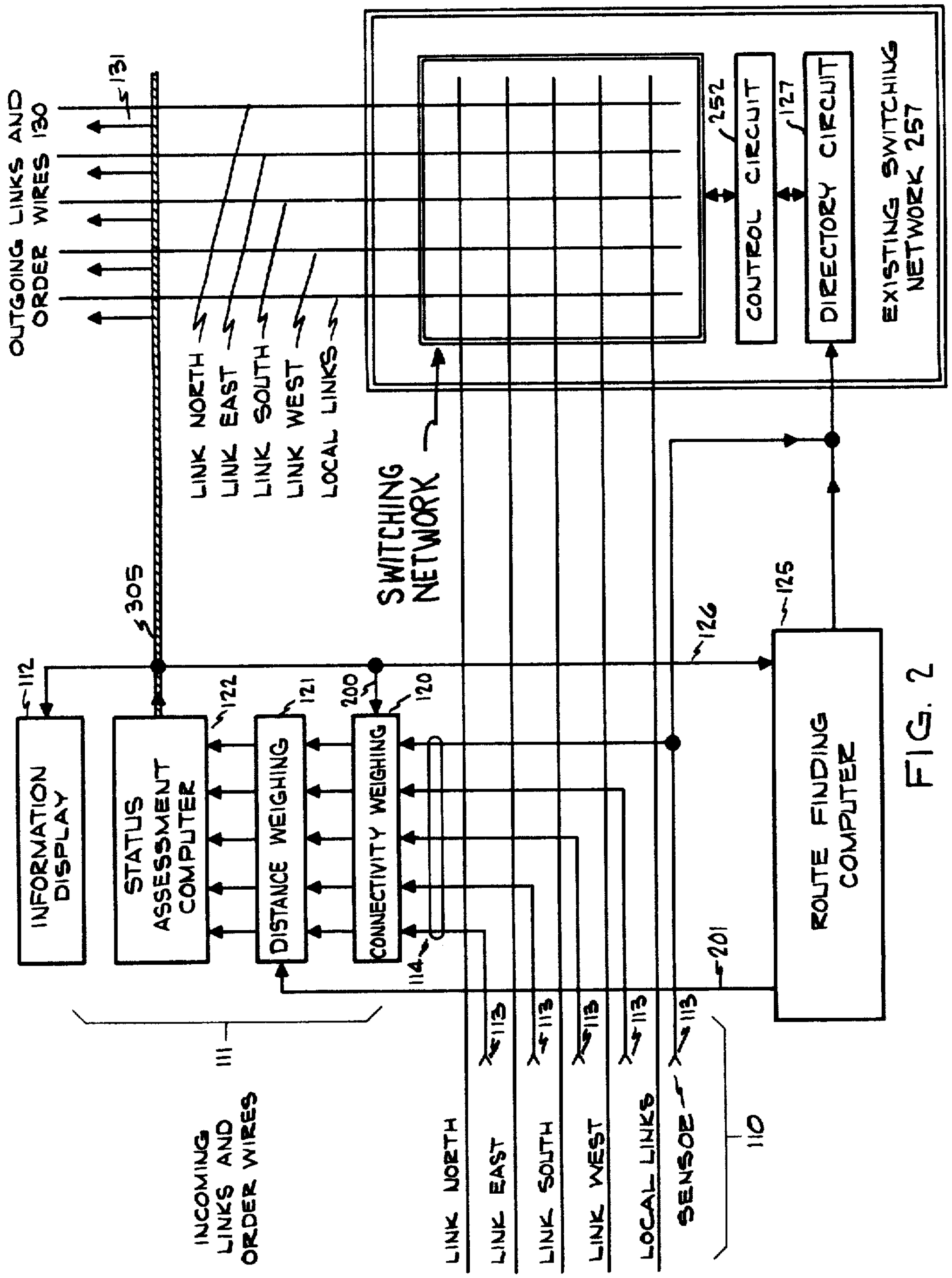
FIG. 2 is a block diagram of a single node point showing how the local computer is connected into the network.

FIGS. 9, 10*a*, 10*b*, 11, 12, 13, and 14 illustrate examples of circuits of use in performing various functions shown in the form of block diagrams in FIG. 2 and FIGS. 8A and 8B.

Figure 1:
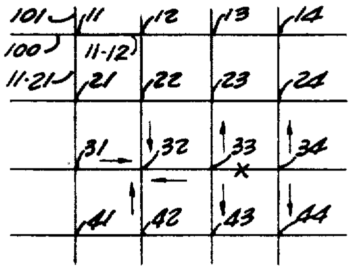
FIG. 1 is an idealized grid network diagram showing how a status computer may be added to an existing network.

FIG. 1 shows a network drawn for purposes of analysis. The various communication channels are represented by vertical and horizontal lines. Switching centers, called "nodes," are located at the intersections of these lines. For example, the reference characters 100 and 101 identify links and the reference character 11 identifies a node. Computers at nodes 11 and 12 "talk" to each other over the link 11–12. Of course, this perfect geometrical pattern is used for pedogogical reasons; it does not exist in such an orderly form in real life.

In telecommunication networks of the type shown in FIG. 1, a system of sensors usually exists as a part of the established equipment. Thus, the sensors do not ordinarily have to be duplicated. Instead, their outputs are used to serve both their original function and the requirements of the local computer. The local computer, a block diagram of which is shown in FIG. 2, broadcasts this locally acquired status information with no further processing to all "adjacent and neighboring" nodes (i.e. those nodes to which it is directly connected via a link). The broadcast is made over outgoing order wire circuits which have been assigned from the trunks or links extending between the local node and adjacent nodes. The exact nature of the sensors is unimportant; they could be fire detectors, voltage level detectors, or any other detectors which are able to sense conditions that make it difficult or impossible for the network to function in the proper manner.

Each node broadcasts status reports to its adjacent nodes and receives status reports from its adjacent nodes. The status information which the local computer receives directly from such local or adjacent sensors is more credible than information received from anywhere else in the network. If the network is a simple symmetric grid, as shown in FIG. 1, the status report which the local computer receives from any one adjacent node contains a status report on the mutually connecting links. For example, node 11 gives node 12 a report on the status of link 12–22. But the local computer in node 12 can observe directly the status of the link 12–22. Obviously, the local observation should be more accurate. In addition, node 11 reports to node 12 on the status of at least three additional links 100, 101, and 11–21 which are connected to the reporting node 11. These three links 100, 101 and 11–21 do not fall under the direct observation of the local node 12.

Since every node receives status reports from its adjacent neighboring nodes, it is evident that remote events reports are received from more than one reporting node. Thus, in time, the local node 12 receives status reports on every event, however remote, from all its adjacent reporting nodes. These received reports are stored in a memory circuit between successive reports. Each local computer examines at intervals the multiplicity of reports received from its adjacent nodes on each event under surveillance. Based on this examination, the local computer decides what the status of each event might in fact be. The local node receives a multiplicity of reports which are equal in number to the number of adjacently connected and reporting nodes. If all of these reports agree, there is no great problem; for example, if all reports indicate that the element in question is out of service, the local computer takes action as if the element in question is in fact unavailable. It records whatever action is required for local usage, such as for local display and route finding, and also transmits its assessment over its outgoing order wires to all of the connected nodes. If a multiplicity of reports is received concerning some specific event and if the reports are in disagreement with each other, the local computer "weights" the reports, computes a weighted balance, and takes that weighted balance to be its assessment of the status of the event in question. The status so derived is then recorded for local use and distributed to all adjacent neighboring and connected nodes over the outgoing order wires.

In greater detail, since this reporting procedure is continuous and reports are periodically reissued at intervals determined by a clocking system installed in each node, the whole process is dynamic. The reports are kept current and under continuous change in accordance with the changes occurring in the network. Since all of the nodes perform in the same way, the node or nodes which directly observe any new event report its occurrence to the network. The information about any event radiates outward through the network in a somewhat circular wave-like fashion. Each ring of nodes, radially positioned outward from the reporting node or nodes, proceeds to process all of these reports through its own re-assessment system. Then it retransmits the results of its reassessment away from itself, both back in the direction of nodes already informed about the event and outward to nodes which have yet to "hear" about the change.

For an example of this reporting, assessing and reassessing, consider the operation ofthe FIG. 1 network when link 33–34 becomes faulty as indicated at X. To make this analysis more general, each node is identified by two digits, the first of which identifies a row and the second of which identifies a column. The broken link 33–34 connects node 33 and node 34. The local computer at node 33 corrects its status report to reflect the broken link and transmits the revised report to nodes 23, 32 and 43. Nodes 34 also corrects its status report and sends it to the nodes 24 and 44. At one of the receiving nodes, say node 32, the local computer receives simultaneously four reports on the status of link 33–34. Node 33 reports the broken link, but since the nodes 22, 31 and 42 have not yet "heard" of the change of status of link 31–34, they report that it is in working condition. Thus node 32 receives three reports that assess link 33–34 to be in service and only one report that assesses it to be out of service.

If a simple majority vote were taken by the local computer at node 32, the three uninformed reporters 22, 31 and 42 would outvote the one informed reporter 33. Such situations are familiar in all heterogeneous information propagating networks. In the circuit being described, it is necessary to introduce weighting multipliers to correct the information based on the "credibility" of its source; otherwise, a false decision would result.

The first weighting factor is a function of the "distance" of the reporter from the event being reported. That distance can be the physical length of the shortest transmission path computed by counting the number of all intervening nodes between the reporting node and the element reported on. The greater the network distance between the reporter and the reported event, the less credible is the report. For example, in the previous illustration, the distance weighting factor might be proportional to the square of the reciprocal of the lowest number of nodes between the reporter and the event. Node 33 is weighted by the number 1. Nodes 22, 42 and 31 are weighted by the number $(1/3)^2$ or 1/9. A tally at node 32 on the weighted votes would then be 3/9 for non-faulty transmission through link 33–34 and 1 vote against. Thus, the assessment at node 32 is in favor of the report from node 33. From this, it follows that the computer at node 32 will make the correct decision.

The second weighting factor relates to the connectivity of the reporting node. The term connectivity" refers to the number of links which are connected to the reporting node. In FIG. 1, for example, every node connects to four links (e.g. node 11 is connected to links 100, 101, 11–12 and 11–21). In a real network, any node may connect to any number of links. A highly connected node is taken as a more credible source than a weakly connected node.

The operations which occur at any given node, therefore, include the sensing and posting of the status of local elements and links incident at the node. In addition, the local computer receives reports from adjacently neighboring nodes concerning remote links and nodes of the network. These reports are also posted. Then, the computer records, displays and remotely broadcasts its assessments of the status of all components of the networks. The final operation of the local computer is that of route finding, as required by the switch at the node.

Two principal advantages should now be clear. Since each node of the network participates in the process of local observation and assessment of received information, and rebroadcasts the same, each local computer in the network acquires a statistical assessment of the status of the entire network. These assessments and reassessments sweep through the network by a wave-like process which radiates circularly from each and every node. A report propagates itself by a mode of relaying through expanding circles of nodes until it reaches the boundaries of the network and is then sustained as a standing wave which is cyclically reconfirmed. Therefore, one advantage is that the acquisition of a complete status description of every component of the network by the described procedure results in a status statement which is as credible as the service which the network can support. A second advantage is that the description endures over a survival interval which is precisely the same as the network it supports. In addition to serving the purposes of route finding, the derived status description may have a display utility which benefits the network owners, managers and users located at or remotedly from any node.

The foregoing describes the sensor system for acquiring and assessing information about the network. In addition, the invention makes use of a director system for controlling the network in accordance with the data which is gathered and evaluated through the sensor system. More particularly, for route finding in telecommunications networks, the switch at any given node receives calls or demands from network subscribers. Usually, these demands require the establishment of connections from one node to other nodes of the network. The designation of the shortest, most available, or least costly connection is made by specifying the intermediate nodes through which the connection should be made. This function is accomplished by a second self-contained computer which is local to each node and connected to the existing director system. This computer is designated as the local "route finding computer."

After the subpart 122 arrives at a consensus of all sensor reports, it supplies information signals based on the concensus to a route finding computer 125 via lead 126. The route finding computer applies potentials to the calling and called nodes in a replica of the actual switching network. If a circuit breaks down along the path of least resistance between marked nodes, then the route finding computer sends out signals indicating the nodes which are in the broken down path. The local directory equipment 127 uses these signals to direct a switch path through the network.

The route finding computer 125 includes a matrix of devices (shown in FIG. 13) which represent the condition of each node and link in the network. This matrix is controlled by the local status assessment computer 122 over line 126. In an embodiment of this second computer, the data relative to the network status are used to control node and link representing impedances which appear in a small electrical replica of the network. When the route finding computer is required to find and designate a route between the local node and any other node in the network, it simultaneously tests all possible routes between the two nodes as they appear in the replica network. The impedances which represent the status of the components in the replica of the network are constructed to break down under impressed voltages. The impressed voltage have voltage levels corresponding to the availability of the corresponding component. Thus, the application of a voltage potential between two nodes in the replica network will break down the path with the lowest sum of breakdown potential thresholds.

By sensing all of the nodes in the replica network, it is possible to identify the nodes in the path which break down by the detection of current flowing through them. Then the nodes supporting a flow of current are identified to local switching equipment. That equipment then sends all signals necessary to direct various switches to complete a path through the real network which corresponds to the path that is broken down through the replica network.

FIG. 2 illustrates how the inventive concept may be divided into a number of parts for purposes of description and analysis. There are an information acquisition part 110, a computation part 111, a part 125 incorporating a model of the system, and an information distribution part 305. The information acquisition part comprises a plurality of status sensors 113 and an inward transmission channel or order wires 114. The exact nature of the sensors is unimportant; they could be fire detectors, voltage level detectors, or any other detectors which are able to sense conditions that make it difficult or impossible for the network to function as it is designed to function. The nature of the transmission channels or order wires 114 is also unimportant as long as the output of the sensors 113 can feed into the computer and the computer can identify the sensor.

The computer 111 is subdivided into three parts 120, 121 and 122. The subpart 120 imparts a weighting factor to all sensor outputs according to the connectivity or capability of the reporting node to complete a connection. The subpart 121 imparts a weighting factor which reflects the distance between the reporting sensor and the reported event. The third subpart 122 assesses all reports that are received, as weighted at 120 and 121, and assesses or passes judgment on them based on the consensus of all sensor reports.

In greater detail, the above description of the "credibility" of the reports and the use of weighting factors makes it clear that the system depends upon a statistical assessment of a number of reports. The reliability of the assessment system depends upon a probabilistic approach rather than on discretionary information used in a deterministic way. Thus a node which is weakly connected into the network by means of only one link, for example, is in a poor position to know the truth of a report as compared to other nodes which are connected to an average of three links. Also, a node which may be strongly connected into the network at some time, due to various inhibiting causes—say two of the three links are destroyed—may become weakly connected at other times due to various inhibiting causes. The connectivity weighting factor may thus be proportional to the ratio of the number of connecting links incident to that node, as of the last known status assessment as compared with the average original connectivity of the nodes in the network. Thus, the connectivity weighting factor for node 33 of FIG. 1 is smaller after destruction of the link 33–34 than it was before such destruction.

The weighting factors take into account the speed with which the entire distributed status assessment computer converges on a revision of its assessed status. This revision includes the condition of all components of the network and the stability with which it performs. For distance weighting, the weak weighting factors could, for example, be directly proportional to the reciprocal of the shortest reporting distance. For connectivity weighting, the factors could be directly proportional to the ratio of present connectivity compared with the average original connectivity. Intermediate weighting factors could be functions of the squares of the weak weighting factors. Strong weighting factors could be functions of the cubes. The exact factors are determined by experimental work for any given network. As a generality, the intermediate distance weighting factor and the weak connectivity weighting factor provide correct decisions for experimentally demonstrated effective speeds of convergence and for stability. Beyond this, it is not possible to generalize further on optimum factors. The important aspect of the invention to note here is that the system provides for varying either or both to suit specific and unforeseeable applications.

Several advantages of the invention should now be apparent. The invention provides a computer which is built into or is like an applique to the network. Since its order wires and other component parts are embedded in the network itself, it is as reliable as the network it serves. The output of sensors and the various signals issued as a result of the computer decisions may be designed to interface with any appropriate equipment. Hence, the invention may be added to an existing network with little or no destructive effects.

Figure 3:
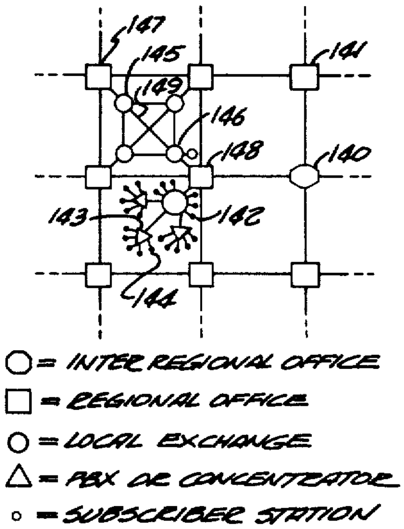
FIG. 3 is a schematic layout of a hypothetical network.

FIG. 2 shows a hypothetical node at which the described system could be employed with existing facilities at the node or a switching center of any existing network, such as that shown in FIG. 3.

FIG. 3 is a regional part of a network which may be expanded as much as necessary. Telephone traffic arrives at and departs from this region via an interregional office, such as 140. Within the region, trunk traffic is carried through a number of regional offices, such as 141. Each regional office has many associated offices, such as a local office 142, and smaller distribution points, such as a PBX or concentrator 143. Finally, there are the subscriber lines, such as 144. Sometimes the local offices may be connected, in tandem, between two or more regional offices, as local offices 145, 146 are connected between two or more regional offices, as local offices 145, 146 are connected between regional offices 147, 148 via link 149. Obviously, this hypothetical example could be expanded, as required, to fit any given network requirements—but this would only serve to increase the complexity of the drawing without conveying additional information.

Figure 4:
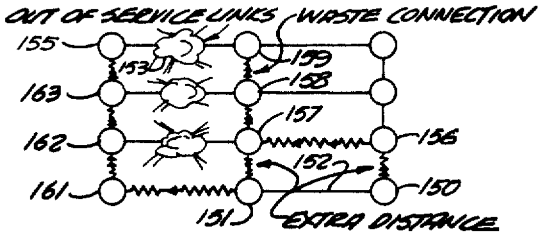
FIG. 4 is further schematics representation of a hypothetical network.

To facilitate an analysis of the invention, it is not necessary to consider a network as complicated as FIG. 3. Thus, FIG. 4 is a simplification which includes a plurality of nodes (such as 150 and 151) interconnected by links (such as 152). The symbol at 153 indicates a link that is out of service. During normal times, for example, the system would route a connection from node 150 to node 155 via nodes 156–159. Now, however, the link 153 is unavailable. According to the prior art, the same old path 156–159 would have been extended until it bumped into the open link 153. Then this path would have collapsed from node 159 through node 158 to node 157. Thereafter a new path would have been extended through nodes 157, 151, 161, 162 and 163. This means that the extension of the path from node 156 to node 159 was a wasted effort and that the path through nodes 156 and 157 is a useless detour and a needless expenditure of transmission capacity. Hence, a primary purpose of the invention is to discover destruction of a link such as 153 and to initially route the call over an available path, such as path 151, 161, 162, 163 and 155.

To accomplish this purpose, each node is given the capability of reporting on its own status and of repeating a weighted report based on an assessment of the reports which it received from other nodes. Thus, in a hypothetical grid-like network configuration, node 78 (FIG. 5A) is shown as reporting its condition to and receiving condition reports from the four adjacent nodes 68, 77, 88 and 79. In another network, with perhaps a more realistic configuration, any number of adjacent and neighboring nodes may be communicating such information to node 78. Therefore, to make the model more general, we could use mathematical symbols where any node is designated by the letters $i$, $j$. Then, the nodes of FIG. 5A may be identified with a matrix convention, as follows:

| Node | Symbol |
|---|---|
| 68 | $(i), (j-1)$ |
| 77 | $(i), (j-1)$ |
| 78 | $(i), (j)$ or $1, j$ |
| 79 | $(i), (j+1)$ |
| 88 | $(i+1), (j)$ |

Figure 5A:
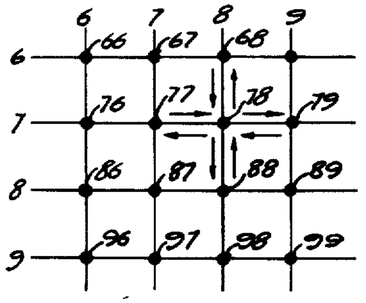
FIGS. 5A, 5B, 5C and 5D are additional schematic diagrams depicting relationships of typical nodes and of relationships between nodes.

When this generalized symbology is used, it is apparent that any node in the network of FIG. 5A may be designated $ij$. Then, each of them transmits to and receives from four nodes designated $(i-1)(j)$, $(i)(j-1)$, $(i)(j+1)$ and $(i+1)(j)$.

While the exact nature of the medium used to transmit the status reports is not material to the invention, it is here assumed that all nodes transmitting over an order wire are time division multiplexed in such a way that a time interval referenced to a synchronizing pulse is assigned to each link or node of the network. Thus, node $i,j$ transmits simultaneously over its outgoing order wires to its adjacent neighboring nodes, as indicated in the above table.

Figure 5B:
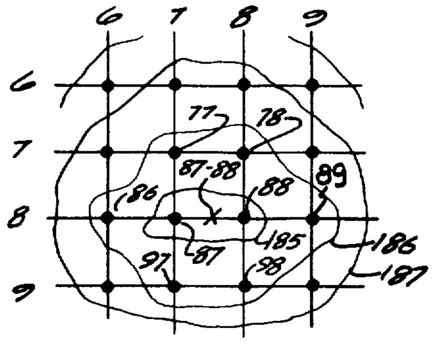

Consider the effects of a circuit disruption as exemplified by FIG. 5B, where something occurs to prevent communication over a link 87–88. The nodes 87 and 88 detect their link failure through associated link sensors (not shown in FIG. 5B) which exist at each end of the link 87–88 to monitor its condition. The link failure may be due to circuit congestion, to a physical break, or to any other condition. Each of the nodes 87 and 88 transmits the information that link 87–88 is out of service. Node 87 tells nodes 77, 86 and 97 and node 88 tells nodes 78, 89 and 98. Being direct observers of the reported event, nodes 87 and 88 regard their sensor's information as authoritative over any other conflicting reports which they may receive from other nodes.

The nodes 77, 78, 86, 89, 97 and 98 receive conflicting reports. For example, at the instant node 87 is reporting that link 87–88 is out of service to node 77, node 77 receives reports from nodes 78, 67 and 76 that link 87–88 is in service. Obviously, as the problem is here stated, for simplicity, these conflicting reports occur because the nodes 67, 76 and 78 have not yet "heard" about the new state of the link 87–88. Thus, at node 77, the reports of nodes 67, 76 and 78 must be weighted downwardly because they are further than node 87 from the link 87–88. In addition, under different network configurations, a node such as 76 may be connected to the network through only one link (say link 76–77) and thus be weakly connected and therefore poorly informed. It is, therefore, necessary also to weight the received reports by the connectivity of the node into the network.

Upon reflection, it should be apparent that the information about network changes spreads through the network in a manner analogous to the flow of concentric waves.

The original report of a status change is represented by a wave front at 185. The first retelling of the information is represented by the wave front at 186. The second retelling is is represented at the wave front 187. In addition, since each node repeats all information in all directions, there are counter ripples flowing backwards from the expanding, concentric waves 185 and 186. Without a status assessment and weighting of the information, this apparent confusion is compounded as each successive shock wave of rumor spreads through the network.

Figure 5C:
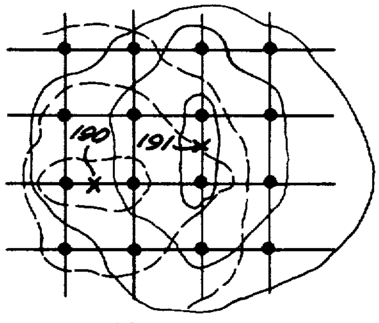

Next consider how complex the problem becomes when multiple failures occur simultaneously. These failures could occur simultaneously because of hurricanes, enemy attacks, or the like. As shown in FIG. 5C, there are failures at 190 and 191 and two coincident sets of shock waves of information on status changes overlap. Thus, the assessment situation tends to become even more complex than that shown in FIG. 5B.

Figure 5D:
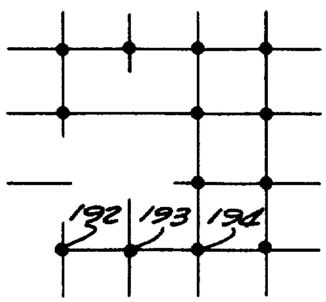

Finally, consider the effect of information spreading through the network after it has been partially destroyed, as shown in FIG. 5D by the missing nodes. The normal complexity is further compounded. For example, node 192 can communicate with the network only through node 193 and node 193 is totally dependent upon node 194 for its information.

The problems created by these and other complexities are solved by the computer 111. First, the computer operation will be explained in a graphical manner. Then it will be explained in a mathematical manner. For the graphical analysis, a hypothetical network (FIG. 6A) to a work sheet (FIG. 6B) is made. For this analysis, it will be assumed that a break has occurred in the link which joins the nodes 42 and 43. The network of FIG. 6A consists of 16 nodes and 24 two-way connecting links or 48 links in all. The average number of links incident to any node is then 48/16 or 3.

Figures 6A, 6B:
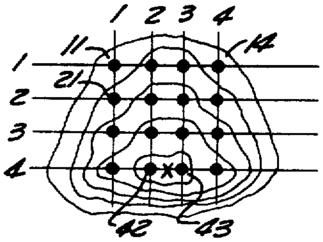
FIGS. 6A and 7A illustrate by graphical mens the relationships between an idealized network of nodes and the transmission of signals indicating a breakdown.
FIG. 6B and FIG. 7B are incidence matrices presenting analyses of how status assessments are made.

The matrix of FIG. 6B, sometimes called an incidence matrix, is constructed in the manner of a road map. A small $x$ has been entered in each cell of the matrix where a connection exists in the network. Thus, there is a link from node 13 to node 14, and an $x$ is entered in the cell at the intersection of a horizontal line drawn from node 13 and a vertical line down from node 14. There is, of course, another link connected from node 14 to node 13.

At the right-hand side of the matrix, there are three colunms. The first, labeled $$d^{ij}_{g'h'}$$

specifies the distance between the corresponding node in the left hand title column and a break which has occurred in the link joining nodes 42 and 43. This distance is computed by counting the number of nodes including the starting and the terminating nodes in the shortest path which can be established between any node $ij$ and the break. Thus, the distance between node 11 and the break is of 5 nodes which are the four nodes vertically down the $i$ column on the left-hand side of the network, and one additional node in the 4 row along the bottom of the network, a total of 5 nodes. Therefore, the first entry in column (1) is the number 5.

The second column, at the right hand side of the matrix, is labeled $$C^{pr}_{ni}$$

This column designates the relative connectivity at the present state $p$ of the network, of the node identified on a corresponding row in the left-hand title column. The relative connectivity is the ratio of actual connectivity to average connectivity. Therefore, since the average connectivity is 3, the two terminating links 11–12 and 11–21 give node 11 a relative connectivity of 2/3. In like manner, the node 12 has a relative connectivity of 3/3 because it has three terminating links. Therefore, the numbers 2/3 and 1 are the first two entries in column (2).

The third column is headed $$W^{p}_{ij,g'h'}$$

to indicate that it is the combined weighting factor which takes into account the relationship between the distance weighting factor and the connectivity weighting factor. In this particular example, the distance weighting factor is taken as the square of the reciprocal of the distance, and the connectivity weighting factor is taken as being equal to the relative connectivity. Thus the combined weighting factor for node 11 relative to an event located in the link between nodes 42 and 43 is $(1/5)^2 \times 2/3)$ which is equal to 2/75.

Immediately after the occurrence of the break in the link between the nodes 42 and 43, the incident nodes 42 and 43 change their status reports for the link from $+1$ (which designates a link in service to $-1$ (which designates a link that is out of service). An $o$ would indicate that the reporting link does not know whether the reported link is in service or out of service.

The matrix of FIG. 6B shows the resulting status assessments which are made in the nodes of the network at this instant $p$ which identifies the link between the nodes 42 and 43 where the break has occurred. The first entry 5$-$1 over $x$ in row 11 indicates that the node 11 tells the node 12 its assessment that the link between nodes 42 and 43 is out of service on the fifth cycle after the break has occurred. In like manner, the number of cycles required for every other node to report its assessment that link 42–43 is out of service to its adjacently neighboring nodes is shown in the entries of FIG. 6*b*. Initially, every node, except nodes 42 and 43, reports an assessment that the link is in service. Nodes 42 and 43 broadcast the change in status through their connecting order wires to their adjacently neighboring nodes. This first broadcast of the status change is shown as an entry 1$-$1 in the rows of nodes 42 and 43. The duplicate entries indicate that nodes 42 and 43 broadcast the information to all adjacently neighboring nodes which are those shown to have connecting links by small $x$'s.

In the second iteration (retelling of the information) each node tallies its received status reports. This tallying is accomplished by multiplying each $+1$, 0, or $-1$ that it received during the last broadcast by the weighting factor in column (3) on the right hand side of the matrix and then adding the products of all such multiplications. for example, consider the posted tallies after the first broadcast of the status change from nodes 42 and 43. The node 41, which terminates two links, receives a $-1$ from node 42 and a $+1$ from node 31. The status assessment computer at node 41 multiplies the $-1$ received from node 42 by the weighting factor 1 and the $+1$ received from node 31 by the weighting factor 1/9. Then, it adds the two products and posts the total or a sum of $-8/9$. It then reassesses the status of the link in question and changes its judgment from "available" to "unavailable." The nodes 32, 33 and 44 also change their assessment to "unavailable."

During the next time period which identifies the broken link, each of the nodes 41, 32, 33 and 44 broadcasts the revised status to its connecting nodes. Until the time of that broadcast, all of the nodes (except for the nodes 42, 43, 32, 33, 41 and 44) continue to broadcast a status assessment that the link in question is in service.

As a result of receiving the changed status reports from the four nodes 41, 32, 33 and 44, the nodes 31, 22, 23 and 34 go through a re-assessment. They revise their status records, as shown in the assessment tally marked as iteration row three in the table at the bottom of the matrix in FIG. 6B. After five cycles or iterations, each node in the network has correctly revised its assessment about the broken link.

Figure 7A:
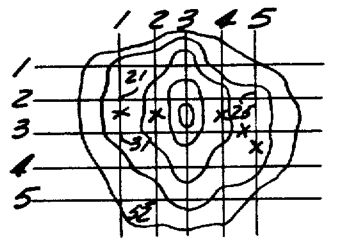
Figure 7B:
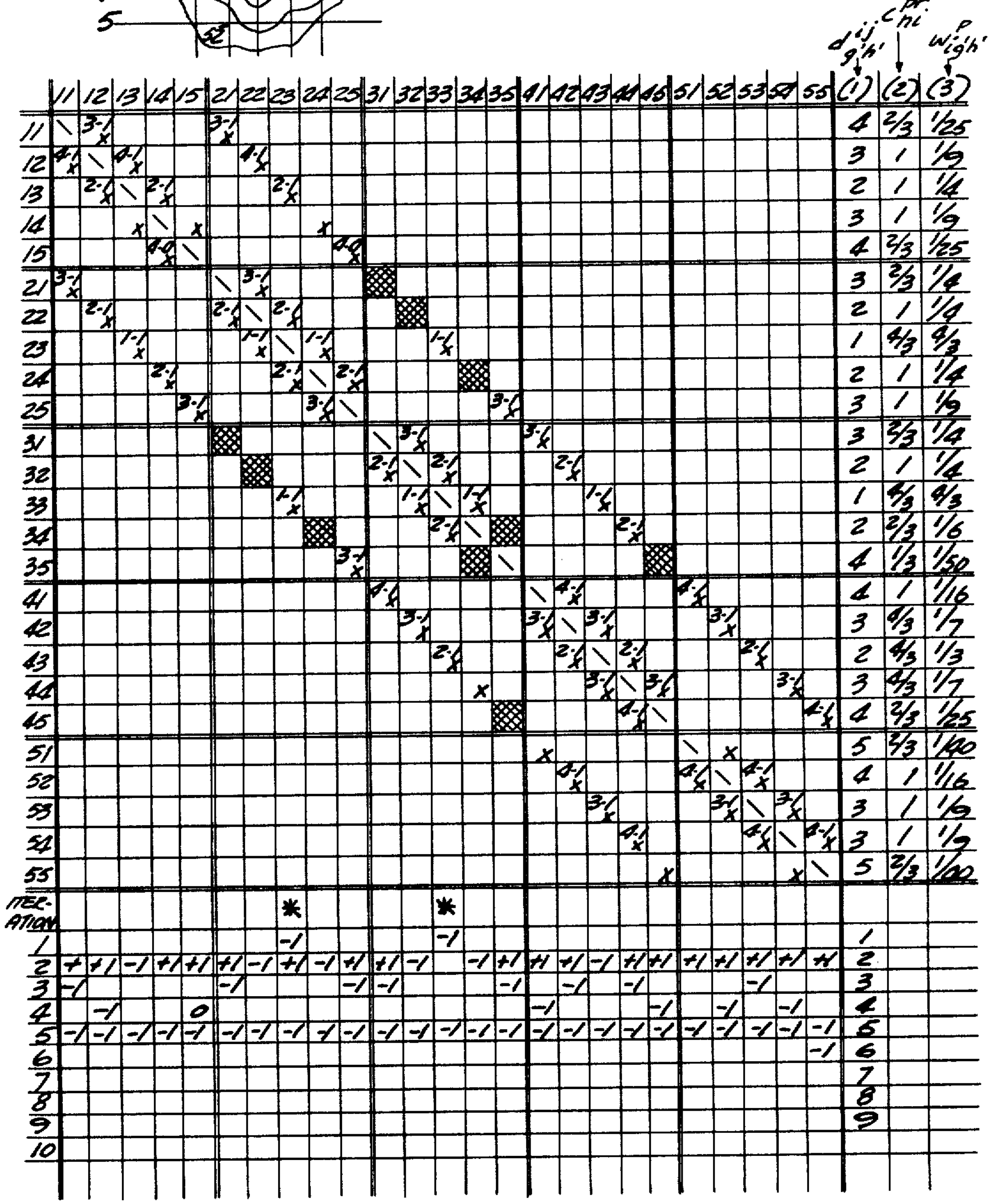

FIG. 6A shows the contour of the wave fronts enclosing the nodes which have corrected their records at each iteration. These wave fronts indicate how the "news" about the break propagates itself. By analogy, the propagation resembles that of a wave spreading across the surface of a liquid after something has been dropped in it. If the surface is unobstructed, the wave tends to form relatively regular radial contours. However, if there are surface obstructions, the waves deform and encircle such obstructions. The analogy of obstructions in a liquid is broken links and nodes, an example of which is shown in FIG. 7A. The details concerning FIG. 7A and FIG. 7B should be obvious from the foregoing explanation of FIG. 6A and FIG. 6B. The calculations are essentially the same; the point is essentially the same: news of broken links spread by successive retellings until every node corrects its assessments.

The following is a mathematical analysis of the computers operations relative to the FIG. 6A and FIG. 6B situation. For this analysis, it is necessary to utilize the tools and techniques of matrix algebra to deal with distributed multivariable processes.

The following notations, definitions, and algebraic relations describe the mathematical functions involved in the operation of the invention.

$p$—network state
$n$—number of nodes in network
$k$—iteration
$s_{ij}$—status of link between node $i$ and $j$ at network status $k$. $k=0$ is the initial state
$s_i^k$, $s_j^k$—status at node $i$ (originating) or $j$ (terminating) in $k$th iteration.
$S_{ix}^p$—$i$th row vector of $[S^p]$ in state $p$.

$$=[s_{i1}^p, s_{i2}^p, s_{ij}^p \ldots s_{in}^p]$$

$S_{xj}^p$—$j$th column vector in state $p$.

$$=\begin{bmatrix} S_{1j}^p \\ \cdot \\ \cdot \\ \cdot \\ S_{ij}^p \\ \cdot \\ \cdot \\ \cdot \\ S_{mj}^p \end{bmatrix}$$

$S^p$—network status matrix in $p$th state $$=\begin{bmatrix} s_{11}^p & \ldots & s_{ij}^p & \ldots & s_{in}^p \\ s_{i1}^p & \ldots & s_{ij}^p & \ldots & s_{in}^p \\ s_{n1}^p & \ldots & s_{nj}^p & \ldots & s_{nn}^p \end{bmatrix}$$

$g'$, $h'$—link coordinate
The convention of an abbreviated identification of a branch will be to reference to the nearest node to the left in the case of a horizontal link or the nearest node up in the case of a vertical link. If the link is horizontal and adjacently right of node $xy$, its designation is $gh'=(x)$, $(y+.5)$. If the link is vertical and adjacently below $gh$, its designation is $g'h=(g+.5)$, $(h)$ $d_{gh}^{ij}$—dimensional distance of a link $gh$ from a node $j$ in number of intervening nodes, counting the incident node as 1

$$d_{gh}=|g'-1|+|h'-j|+.5 \qquad (1)$$

where $|\ |$ designates a positive difference regardless of the sign of the remainder after subtraction $C_N^p$—network connectivity in state $p$ $$C_N^p=\sum_{i+1}^{m}\sum_{j=1}^{m}\overset{+}{s}_{ij}^p \qquad (2)$$

where the $$\overset{+}{s}_{ij}$$

are the links in existence at state $p$ $C_{N\max}^p$—maximal connectivity$=(n)\ (n-1)$ (2a)

$C_N^o$ —$=2(n-1)$ for an open line network in $p=o$ (2b)

where the descriptor "open" refers to a grid contained in a two dimensional space (surface) on which the four edges cannot join. A grid or line can be closed if it covers a spherical surface.

$=4(n-\sqrt{n})$ for an open square grid network (2c)

$=4(n-\sqrt{n})+2(\sqrt{n}-1)^2$ for an open gird connected network (2d)

$=(\sqrt{2n}-2)(2\sqrt{n}-1)$ for an open grid diagonally connected network (2e)

$C_N^{pr}$ —relative network connectivity in state $p$ $$=\frac{C_N^p}{C_N^o} \qquad (3)$$

$C_{ni}^p$ —afferent connectivity of node $i$ in network state $p$ $$=\sum_{j=1}^{n}\overset{+}{s}_{ij} \qquad (4)$$

$C_n^p$ —average nodal connectivity of network in state $p$ $$=\frac{C_N^p}{n} \qquad (5)$$

$$\frac{C_N^o}{n}=\frac{(n)(n-1)}{n}=n-1 \text{ for a maximally connected network} \qquad (5a)$$

$$=\frac{2(n-1)}{n} \text{ for open line} \qquad (5b)$$

$$\frac{4(\sqrt{n}-1)(\sqrt{n})}{n}=4\left(1-\sqrt{\frac{1}{n}}\right) \text{ for open square grid} \qquad (5c)$$

$C_{ni}^{pr}$—relative efferent connectivity of node $i$ in state $p$ $$=\frac{C_{ni}^p}{\overline{C}_n^o} \qquad (6)$$

$$=\frac{\sum_{i=1}^{n}\overset{+}{s}_{ij}}{\overline{C}_n^o} \qquad (6a)$$

$w_{ig'h'}^p$—weighting factor for node $i$ relative to link $g'h'$ in network state $p$ $$=w_i^{pd}\times w_i^{pe} \qquad (7)$$

$w_{ig'h'}^{pd1}$—weak distance weighting factor for node $i$ relative to a link $g'h'$ in network state $p$ $$w_i^{Od1}=\frac{1}{4d_{g'h'}-2} \qquad (7a)$$

$w_{ig'h'}^{pd2}$—standard distance weighting factor for a simple open grid $$=\frac{1}{d_{gh}^i 2} \qquad (7b)$$

$w_i^{pe1}$—standard connectivity weighting factor $=(C_{ni}^{pr})^1$ (7c)
$w_i^{pe2}$—strong connectivity weighting factor $=(C_{ni}^{pr})^2$ (7d)

$e_{ij}^k(g'h')$—$k$th iteration estimate received at a node $j$ from a node $i$ concerning the status of a remote link $g'h'$
$E_j^k(g'h')$—column vector of $k$th iteration estimates at node $j$ from all incident and reporting stations $i$.

$$\begin{bmatrix} e_{1i}^{k}(g'h') \\ \cdot \\ \cdot \\ e_{ij}^{k}(g'h') \\ \cdot \\ \cdot \\ e_{ni}^{k}(g'h') \end{bmatrix} \tag{8}$$

$|E^k(g'h')|$—matrix of estimates delivered at all nodes from all incident nodes concerning link $(g'h')$ in iteration $k$.

$$=\sum_{j=1}^{n}\sum_{i=1}^{n} e_{ij}^{k}(g'h') \tag{8a}$$

$|W_{igh}^{p}|$—row matrix of weighting factors for a reporting node $i$ relative to link $g'h$ at $p$th state $$=[w_{i1}, w_{i2}, w_{ij} \dots w_{in}] \tag{9}$$

$|S^k(g'h')|$—status estimate of $g'h$ by entire network in $k$th iteration $$=[W^k]\times[E^k(g'h')]$$

$$=[w_1 \dots w_j \dots w_n]\begin{bmatrix} e_{11}^k & e_{12}^k & e_{1j}^k \dots & e_{1n}^k \\ e_{i1}^k & \dots & e_{ij}^k \dots & e_{in}^k \\ e_{n1}^k & \dots & e_{nj}^k \dots & e_{nn}^k \end{bmatrix} \tag{10}$$

$$=\left[ w_1\sum_{i=1}^{n} e_{i1}^k \dots w_i\sum_{i=1}^{n} e_{ij}^k \dots w_n\sum_{i=1}^{n} e_{in}^k \right]$$

$|S(g'h')|$—final status estimate of $(g'h')$ $p$th state of network (10a)

NOTE: $|S^k(g'h')|$ and $|S(g'h')|$ are products of a row vector (matrix of order $l x n$) and a matrix of order $nn$ and are therefore matrices of order $ixn$, i.e., row vectors.

The computation is an iterative process which can be more easily understood by reference to the example in FIG. 6A and FIG. 6B. An understanding of the process leads inferentially to the following functional design:

(1) The network for the example is the square sixteen node open grid of FIG. 6A. The connectivity at the initial state ($p=0$) is represented in the matrix of FIG. 6B by small $x$'s in the $\overset{+}{s}_{ij}$ cells.

(2) In state $p=1$ link $(g)(h)=(4)(2.5)$ is broken [as indicated at $x$ in FIG. 6A].

For all nodes $i$ of coordinate $x_iy_1$ compute $$d_{gh}^{i}$$

by Equation 1 and write the column vector $$D_{gh}^{i}$$

Compute for each $$d_{gh}^{i}$$

the distance weighting factor $$w_{ig'h'}^{1d2}=\frac{1}{(d_{gh}^{i})2}$$

and write row vector $$W_{igh}^{1d2}$$

(3) Compute the average nodal connectivity $$\overline{C}_{n}^{0}$$

for the initial state by equation (5c)

$$=\frac{4\sqrt{n}-1}{n}=\frac{4(\sqrt{16}-1)}{\sqrt{16}}=3$$

Compute the relative connectivity and thus the standard connectivity weighting factors $$w_{i}^{pcl}=(C_{ni}^{pr})^{1}$$

for each node $i$ in network state $p=1$ and write the row vector $$C_{ni}^{1r}=W_{i}^{pcl}$$

(4) Compute the weighting matrix $$W_{igh}^{p}$$

for state $p=1$ by the operation $$W_{igh}^{p}=W_{igh}^{1d2T}\cdot W_{i}^{pcl}$$

Where $|X|^T$ is the transpose of $|X|$.

This is, of course, a row vector composed of the inner products $$W_{ig'h'}^{p}=\sum_{i=1}^{n}(w_{igh}^{1d2})(w_{i}^{pcl})$$

(5) Begin the set of iterations as follows: In the first iteration $k=1$ for state $p=1$, the $$e_{ij}^{k}(g'h')$$

entries in all $$\overset{+}{s}_{ij}$$

cells of the matrix are $+1$ except the cells 43–42 and 42–43 which represent the bidirectionally broken link. The vector $S^1$(43–42) computed by Equation 10 is $w_1\sum_{i=1}^{n} e_{i1}^{1}=(2/75)(1)+(1)(1)=+1$ for node 11; $(1/3)(1)+(1/6)(1)+(1)(1)=-1$ for node 42, etc.

At this iteration, signal indications of the resulting $S^1$(43–42)$=+1, +1, \dots -1, -1, +1$, are broadcast to adjacent nodes by nodes 42 and 43. This revised broadcast is entered as revised $$e_{ij}^{1}(g'h')$$

in the rows of nodes 42 and 43.

(6) The procedure of paragraph (5) is repeated for each successive iteration 2, 3, etc. The contours of propagation as a function of cycle or iteration number is pictured in the network drawing FIG. 6A. The results are shown in the iteration record at the bottom of FIG. 6B. On the fifth iteration, all nodes have revised their status assessment of the broken link, and the status knowledge has entered a permanently stationary condition in the circulating status system of the entire network and remains stable.

Under a variety of network connectivity conditions, the system converges on a correct estimate in a very few cycles, and intermediate weighting factors are adequate for a high degree of network disablement. However, a status acquiring, assessing, and utilizing system of this type should be designed on a principle of optional and sequential resolution. If the system operates continuously on a global scale (e.g. status reports are limited to the condition of inter-regional offices 140, FIG. 3), it will likely use the most coarse grained resolution level. However, if information is broken down to, say, one out of many links, a second level of resolution should be obtained by interrogation on a subordinate level. Such a ranking corresponds to observer interest.

The role of weighting vector $$W_{igh'}^{1}$$

crucial, Heuristically, this is equivalent to weighting informers as a function of their nearness to the scene of the event being reported and their receptivity or connectivity to sources of information. If these factors of nearness and connectivity are too weak, the advice of bad informers is taken. The population separates into subsets which arrive at opposite conclusions, some of which are right and others of which are wrong. Potentially, this situation of weak connectivity culminates in an irreconcilable schism. If these factors are too strong, the informers which are "close" and "connected" dominate. Since these informers can be in error despite their closeness and connectivity, the risk is that an erring leader can create a convinced group of followers whose wrong conviction cannot be dislodged. To avoid this erring leader effect, computer simulations may be required to determine the optimum weighting factors.

A useful insight into the weighting process can be gained from viewing it as one of a closed loop feedback and control. The closed loop structure is directly evident from the block diagram of FIG. 2 where signals received over order wires 114 are used by computer 122 to make decisions which are then fed back into the network over order wires 130, to the connectivity weighting computer 120 via wires 200 and to the distance weighting computer 121 via wires 126 and 201. All closed loop adaptive feedback systems are subject to certain "aberrations" such as, oscillation with possible divergence to a state of jittering incoherence, over-damping and failure to converge on an estimate in a reasonable number of iteration, impacting in a self-contradictory breach or the like. These aberrations should be prevented by the weighting factors selected as a result of the manual simulations.

The initial weighting factors are modified by the information feedback. The distance weighting factor is, of course, fixed by the geographic and structural matrix of the network. As parts of the network become unavailable paths take circuitous detours and the distance between two nodes may change. When it does, the weighting factor is modified. Generally, systems which work under minor perturbation, may fail under large scale network destruction if this form of adaptivity or "learning" is not built into the system.

The connectivity weighting factor is also corrected as the network changes from one to another state, much as the distance weighting factor is corrected. The connectivity factor for a given node varies directly with the number of nodes reporting to the given node. For a minor potential destruction, the connectivity weighting factor can be fixed on the basis of state $p$—0. However, under conditions of major destruction the weighting factor has to be recomputed with each major change of state.

A more sophisticated routing system will take into account the rate of change of state as a function of, say, traffic. With traffic status information available, the status resolution metric may be refined to accommodate the proportion of free trunk capacity available in each link under the current congestion conditions. Therefore, the status may be described not merely as "yes" (+1), "don't know" (0) and "no" (−1), but also on a probability scale based on, say "10%, 25%, 50%, 75% loading" for each in-service link.

The system may operate on a status metric of any number of $\gamma$ levels by providing $\log_2 \gamma$ bits of information for each link and node depending upon economic and operational considerations. The cost of a computation and transmission system rises approximately as the logarithm of levels. Thus, a system maintaining 4 bits (16 levels) of information, per event, will cost about two times as much as one maintaining 2 bits (4 levels). Operationally, since complexity and speed of transmission increase with each added level, unreliability also increases.

The equipment for accomplishing these functions requires an order wire or a pilot channel (here described as a time division multiplex channel) in each link of the network for disseminating the status information. This status information may be propagated over this order wire at any one of a range of speeds. However, the speed should be fast enough to make it unlikely that a change will occur during the interval between a change of status in a link and the execution of a demand for a connection over that link and slow enough to avoid reaction to insignificant and transient disturbances. The highest demand rate is found by a statistical analysis of call traffic.

For a rough approximation, the probability of a change of state in an instant $\tau$ is equal to $\Delta(1-e^{-\tau/\bar{t}})$ where $\Delta$ is the grade of service and $\bar{t}$ is the average holding time. It is desired that $\Delta \ll (1-e^{-\tau/\bar{t}}) < 1$. If $\Delta$ is .9 and $\bar{t}=3$ minutes then, for $x$ in $e^{-x}$ small, $$e^{-x} \cong 1-x$$

and $$1-\tau/\bar{t} \gg \Delta$$

$$\tau \ll (1-\Delta)\bar{t} = (1-.9)(180) \text{ seconds} = 18 \text{ seconds}$$

Thus, a response time of $\tau \leqq 3$ seconds is the desired goal.

If, now, the number of links under surveillance in the system is $m$, the number of bits per link is $b$ and the number of cycles per status estimation is $c$, the speed of transmission B must be $$B = \frac{mxbxc}{\tau} \text{ bits per second}$$

For a 50 link system at 2 bits per link, and 10 cycles maximum $$B = \frac{50 \times 2 \times 10}{3} = 300 \text{ b.p.s.}$$

In general therefore, the status transmission requires one medium capacity channel per internodal trunk. For small networks a teletype (50 to 150 b.p.s.) channel provides an adequate transmission capacity; for intermediate networks, a 150 to 600 b.p.s. data channel is adequate; for very large networks, a 300 to 1200 b.p.s. data channel may be required.

For a better understanding of the computer equipment that is located at each node, reference may be had to FIGS. 8–12. FIG. 8 is a block diagram of the computer 111 and route finding computer 125 (previously shown in FIG. 2). The symbols at 210 and 212 are used elsewhere in the drawing to represent the sources of information received from and sent to other nodes. The order wires 113 of FIG. 2 appear at 213, 214, 215 and 216 in FIG. 8. The outgoing order wires 130 in FIG. 2 appear at 217, 218, 219 and 220 of FIG. 8. The links extending north, east, south and west appear in FIG. 8 at 221, 222, 223 and 224, respectively. All remaining blocks in FIG. 8 represent the computer used to assess the condition of the various nodes in the network.

On the left-hand side of a dot-dashed line in FIG. 8, are four links extending outwardly into the network from the local node in the illustrative north, east, south and west directions. The local computer is shown on the right-hand side of the dot-dashed line in FIG. 8.

Since each of the links is connected in this node into the same type of equipment, only that equipment which is associated with the link extending to and from the north 221 will be described in detail. The incoming half of this equipment includes a buffer storage circuit 230, an error detection circuit 231, and demultiplexing equipment 232. The outgoing half of this equipment includes multiplexing equipment 233 and error coding equipment 234. (Items 230 and 231 are optional and are required where poor transmission is anticipated.)

In addition, all sensors in the local node report to the computer about the conditions in the local node relative to the sensors in the directions of transmission. Thus, via order wire 235, the local node received information about the condition of the local equipment for transmitting over all out-going links. In like manner, the condition of local equipment for transmitting east, south or west, is sent into the local computer via the order wires 236, 237 and 238. The condition of each node is derived from sensors built therein. While the invention does not depend upon any particular sensor system, it is contemplated that each node in the network contains certain sensors (not shown), but already built therein. These local sensors are associated with trunk transmission equipment such as multiplex, power supplies, power amplifiers, diversity combines, etc. If the local sensors are not already built into these equipments, they must be custom engineered to meet specific requirements of the computer. The node's assessment of the status of the total network is sent out through time division multiplex equipment such as 233. It, in turn, sends a special signal representing the status message to the error coder. Finally, the signal is modulated for transmission over the order wires to adjacent nodes. Status messages out of multiplex equipment 233 are transmitted over order wires 217, 218, 219 and 220 to the adjacently neighboring nodes.

The error coder 234 encodes these signals to facilitate a detection of transmission errors. This coder and the decoder 231 employ the same equipment using simple shift registers. These registers provide an error detection code which is utilized to prevent, with a very high probability, the errors caused by the transmission system from being fed into the computer. Except for poor transmission systems, error detection 234 is not necessary because the computer is a statistical, decision-making device which does not rely overwhelmingly on information from single sources. Additionally, the computer is continuously re-computing the status reports, and this results in intrinsic error minimization.

Of course, the link 221 may be connected to any other suitable transmission or receiving equipment (not shown) such as multiplex equipment, carrier or radio transmitters, or receivers, etc. In this manner, the local computer is made compatible with any associated equipment. When the status messages are received from this equipment, they are written into a buffer storage circuit 230 where they are coordinated with a local clock pulse, if required. Then they are released to the error detector 231 which looks for transmission errors. Thereafter, the messages are demultiplexed at 232 and converted back into the form of individual signals for each network link.

The local computer 111 includes the connectivity weighting computer 120, the distance weighting computer 121, and the status assessment computer 122. After the sensor signals have been demultiplexed at 232, they are fed into the connectivity weighting computer 120. Here the signals are modified in accordance with the number of sources (links) of information available to the northern node (in the case of link 221). Then the signals are fed into the distance weighting computer where they are modified in accordance with the distance (number of nodes) between the northern node (in the case of link 221) and the reported link. The distance weighting computer 121 computes the squared reciprocal of the distance between the reported link and the node reporting the status of the link. Thus, the computers 120 and 121 have modified the output of the demultiplexer 232 to provide the status assessment computer 122 with weighted values for each network link from each of the terminating trunk order wires 221, 222, 223, etc. These are the weights in columns (1) and (2) of FIG. 6B. Then, the signals are fed into the status assessment computer 122.

All nodes in the network are identified by a particular time slot. Thus, the status assessment computer 122 in FIG. 8 receives simultaneously positioned reports from north, east, south and west concerning the status of a link identified by the time slot then in progress. These reports are received at the node over the links 221, 222, 223 and 224, and at the status assessment computer over the wires 240, 241, 242, and 243. In like manner, the status assessment computer receives local reports about northward transmission over order wire 235. The status assessment computer then integrates all of these reports to provide a single output signal which represents the local computer's assessment of everything which it has heard.

For one hypothetical system, the incoming and outgoing data channels, extending links 221, 222, 223 and 224, operate at a speed between 75 and 1200 bits per second. The quality of the telephone lines must be adequate to transmit the data with a low probability of error. At the speeds discussed, the reliability of performance can be obtained by well known low or medium speed frequency shift modulation equipment. The system application discussed herein assumes three levels of operation, (+1, −1, and 0); thus, a synchronous frequency shift modem with three carrier positions would be directly applicable and economical. For 300 and 600 b.p.s., the three levels +1, 0, and −1 might be represented by carrier frequencies of 1800, 1200 and 600 b.p.s. respectively. For 1200 b.p.s., carriers of 2400, 1800 and 1200 b.p.s. respectively would be appropriate. Of course, these specific examples are cited for purposes of illustration and do not represent limitations on the invention.

The outputs 245, 246 and 247 of the status assessment computer 122 can be displayed at **112*a* and 112*b* and used to modify the parameters of the connectivity weighting computer 120. This local assessment is transmitted also over the order wires 217, 218, etc., of each outgoing links 221, 222, 223 and 224**.

The output of the status assessment computer is also transmitted to the route finder computer 125 which determines the optimum route between the node at which the computer is located and all other nodes of the network. For example, if a subscriber at node 13 (of FIG. 1) dials the number of a subscriber at node 34, the route finding computer will select a route which avoids out of service link 33–34. This could be through the nodes 13, 23, 24, 34. This route information is then transferred to a route code in matrix 250 for translation into the network numbering plan. Thereafter the addresses of the selected nodes are transferred to the node switching center equipment 251. The routing information read out of the matrix 250 is stored in the switch center directory circuit 127. The routing signals are then made available to the common control 252 when it is required.

Primarily, the status assessment computer 122 is a summing circuit for adding together a number of voltage pulses. Each pulse represents the weighted status assessments received from north, east, south and west via a number of order wires. The sum of these voltage pulses, as weighted at 120 and 121 is the local assessment of the reported node. Thus, there is a consensus which is the statistical estimate of the status of each link in the network.

The route finding computer 125 determines the optimum route from the nodal location of the computer to every other node in the network. The route is based upon the output of the status assessment computer 122. This route information is sent to the node switching equipment of the coding matrix 250. The local display **112*b* visually displays the routing information for human monitoring purposes. The directory store circuit 127** utilizes, at a remote point, the estimated instantaneous status of all network links to command the establishment of the desired path.

FIGS. 9–14 show the circuitry used in one exemplary system to provide the functions illustrated by the blocks in FIG. 8. Of course, the invention is broad enough to cover any suitable means for performing the desired functions.

Figure 9:
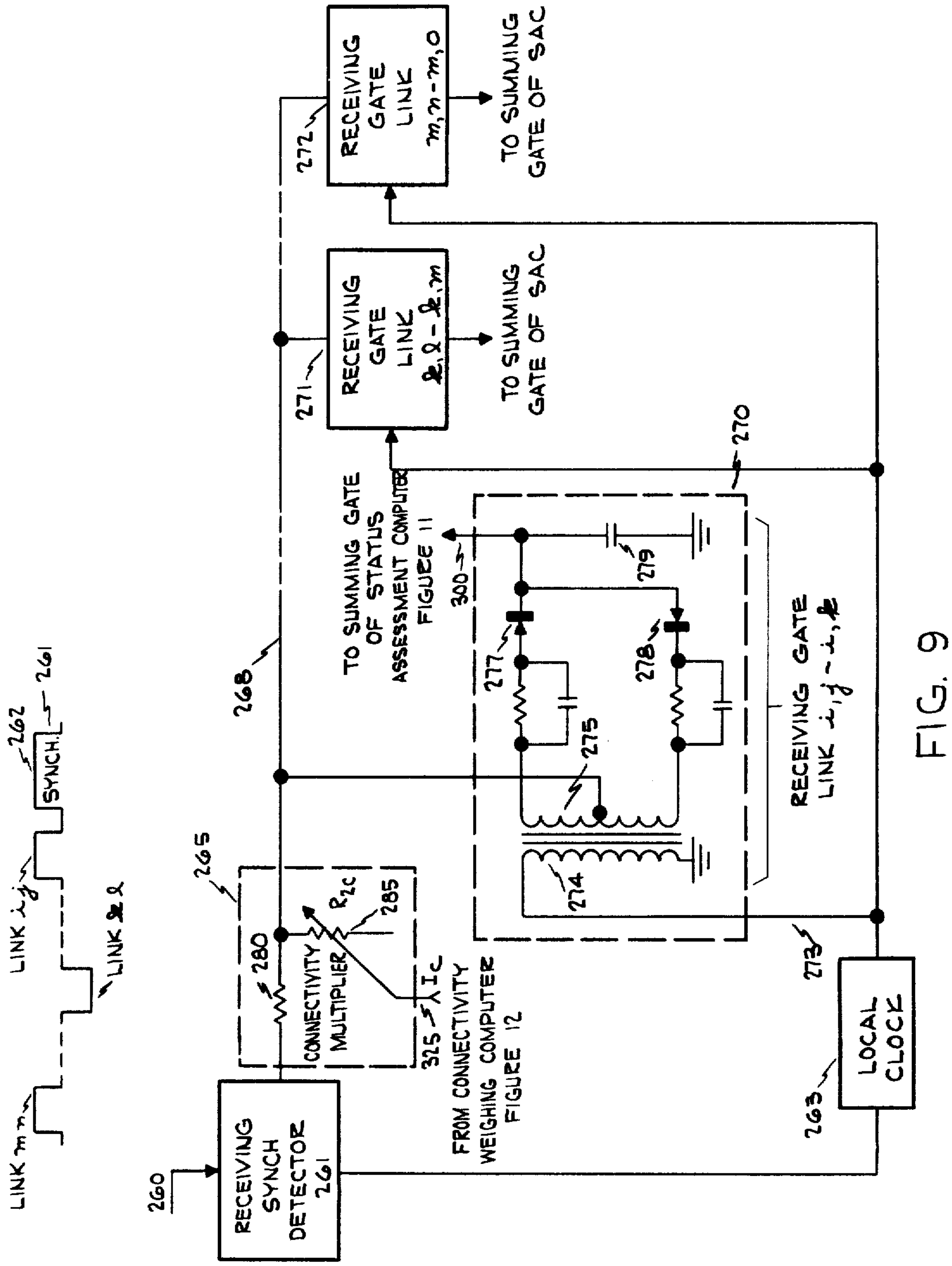

FIG. 9 illustrates the circuit used in the demultiplexer 232 and its inter-relationship with the weighting and assessment computer. The purpose of the demultiplexer is to separate the status reports and identify their relationship to the individual links in the network. For illustrative purposes, the description is limited to equipment for receiving signals from a single source, such as the north wire 213; a description for the other wires would be the same. For simplicity in circuit design, the connectivity multiplication function of computer 120 is combined with the demultiplexing circuit 232. The circuit of FIG. 9 comprises an incoming bus 260, a local clock 263, a connectivity weighting multiplier 265, and a number of receiving gates 270, 271 and 272. Each receiving gate corresponds to an individual link in the network; for example, gate 270 has been designated *i, j–i, k* to indicate that it corresponds to the link between node *i, j*, and node *i, k*.

The output (from FIG. 8) of the error detection equipment 231 is fed over wire 260 to a receiving synchronizing detector 261. The curve 262 represents the incoming stream of status report signals. First there is a synch pulse 261; then there is a pulse reporting the status of link *i, j*, then of link *k, l*, and a further pulse indicative of the status of each link. The time base of the incoming stream of pulses 262 is derived from the synch pulse 261 which drives the local receiving clock 263 at the system frequency. The output of the synch detector is transmitted to the connectivity multiplier 265 where the composite stream from a given node is modified according to the connectivity of that node of pulses relative to a given connectivity into the network during the preceding status interval. In effect, the connectivity weighting computer may be thought of as a source of a variable voltage controlled by the operation of variable resistor R2*c* to move up or down in accordance with the number of links connected to the corresponding node. The composite stream of pulses as weighted is distributed over receiving bus 268 which has receiving gates, such as are indicated in the blocks 270, 271 and 272, connected thereto. The number of gates is equal to the number of links in the network under surveillance.

The pulses from the receiving synchronous detector clock or local clock 263 are used to drive the receiving gates associated with each link. Primary winding 274 of summing gate 270 is energized by the local clock 263 only during those time slots which correspond to the moment when a voltage indicating the status of link *i,j–i,k*, is on bus 268. When a clock pulse is transmitted over wire 273 to the primary winding 274 of the transformer, a voltage is induced in the secondary winding 275. This voltage on bus 268 is sufficient to cause the diodes 277 and 278 to conduct, permitting the referenced incoming signal to be transferred from 268 to store 279. Actually, if the source impedance of 268 is very low, the voltage at 270 adjusts to the voltage at that instant on bus 268.

Similarly, the clock 263 drives receiving gate 271 at a time when the voltage on the bus 268 corresponds to the condition of the link *k, l–k, m*.

The time division multiplex frame rate is:

$$F=\frac{B}{mb+p}$$

where:

F=the frame rate

B is the transmission rate in bits per second

*m* is the number of links under surveillance

*b* is the bits of information per link

P is the number of bits for frame identification and parity checks.

Thus if $B=300$ b.p.s., for example, $m=32$, $b=2$, $p=8$.

$$\text{Then } F=\frac{300}{(32)(2)+8}=\frac{300}{72}\cong 4 \text{ per second}$$

The function of the weighting computer is to generate the vector defined previously by Equation 9.

$$w^{p}_{igh}=[w_1w_2 \ldots w_i \ldots w_n]$$

$$=[w^{pd2}_{igh}]^{T}\cdot[w^{pc1}_{i}]$$

$$=w^{pd2}_{1gh}w^{pc1}_{1} \ldots w^{pd2}_{igh}w^{pc1}_{i} \ldots w^{pd2}_{ngh}w^{pc1}_{n}$$

Assume that a node *i,j* receives reports on a disturbed link between nodes *gh* and *g,g* from the four adjacently neighboring nodes. These are the nodes $(i,j-l)$, $(j-l, j)$, $(i,j+l)$, and $(i+l,j)$. The weighting computers 120 and 121 compute the product of the relative connectivity of the reporting node and the squared reciprocal of the distance from the reporting node (such as $i,j-l$) to the unavailable link (the information in the right-hand columns on FIG. 6). These weights are represented by a specific voltage which varies as the weights vary.

Figure 10A:
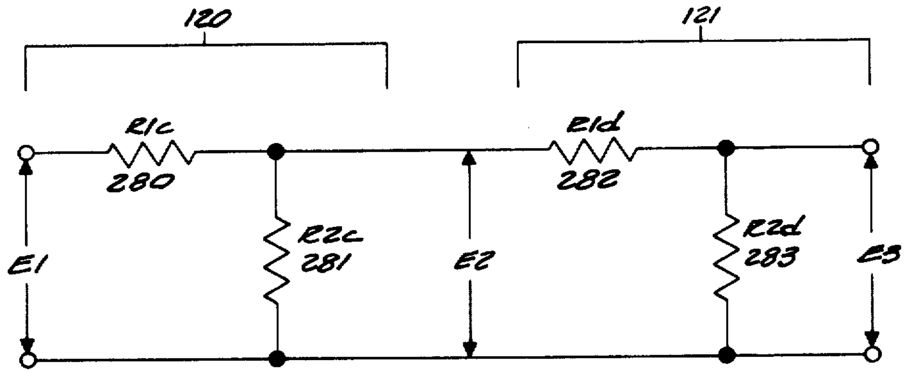

Multiplier circuits for providing such voltage variations are shown in FIG. 10*a* where resistors 280 and 281 form a voltage divider for dividing the voltage $E_1$ to produce the voltage $E_2$ which is a function of connectivity. In like manner, the resistors 282 and 283 form a voltage divider for dividing the voltage $E_2$ to become the voltage $E_3$ which is a function of distance.

In a minimum capability computer, the resistors 280, 281, 282 and 283 may be simple, low cost devices preselected on an appropriate optimum basis. In a higher capability computer, one or more of the resistors may be devices such as varistors, shown as 285 and 286 in FIG. 10B, which may be varied in accordance with actual changes in network conditions. The current I*c* is derived from the status assessment computer 122 via the connectivity computer 120 and the current control I*d* is derived from the route-finding computer 125. The important thing is that the voltage $E_3$ represents a statistical assessment of the credibility of a reporter node with respect to a given link.

Figure 10B:
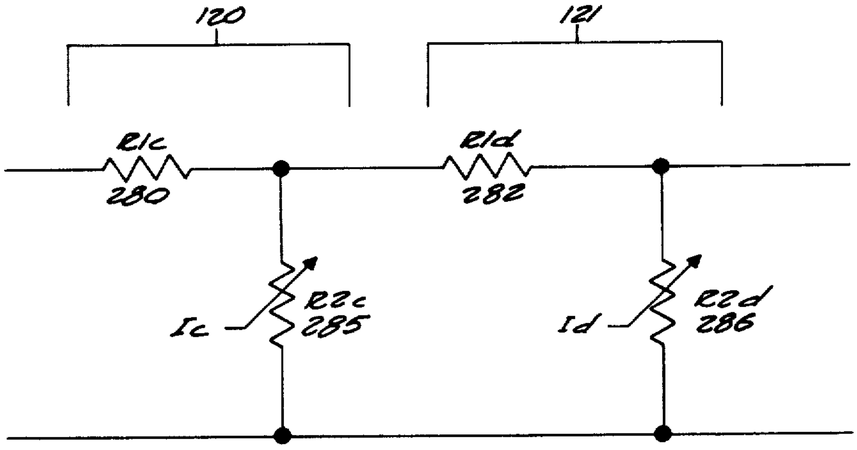

The two (connectivity and distance) multipliers are shown in tandem in FIG. 10A and in FIG. 10B. However, in practice, considerable savings can be realized by employing only one connectivity multiplier for each composite status message. Thus, each link terminating at the connectivity weighting computer has a single connectivity multiplier circuit 265 but a number of distance multiplier circuits which are equal to the number of links in the network under surveillance.

In some circuits, the voltage divider 280, 281 is separated from the voltage divider 282, 283 by an unidirectional amplifier.

In which case:

$$w^{pd2}_{igh}=\frac{R_{2d}}{R_{1d}+R_{2d}}\cong\frac{R_{2d}}{R_{1d}} \text{ if } R_{1d}\gg R_{2d}$$

and $$w^{pc1}_{i}=\frac{R_{2c}}{R_{1c}+R_{2c}}\cong\frac{R_{2c}}{R_{1c}} \text{ if } R_{1c}\gg R_{2c}$$

Figure 11:
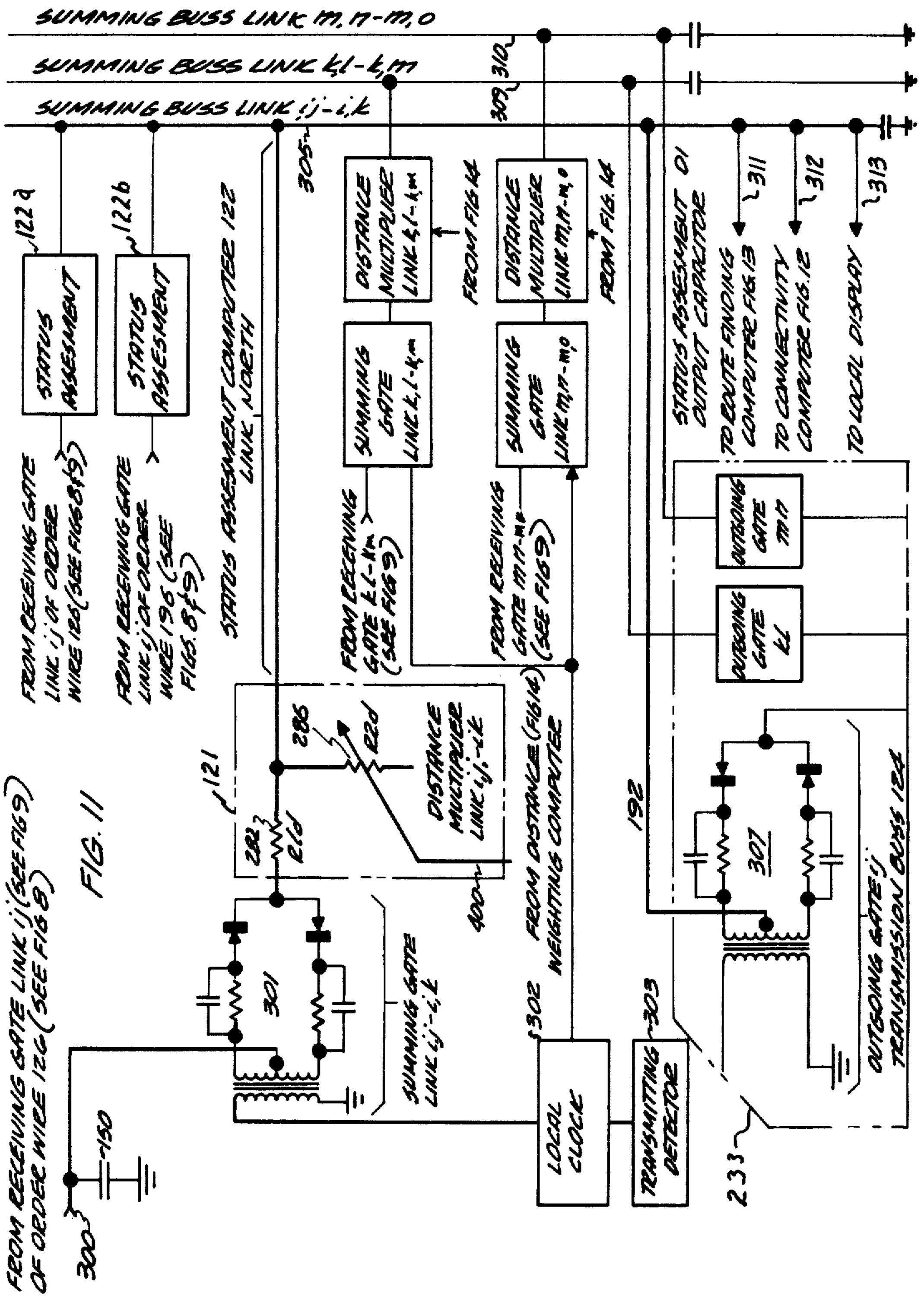
Figure 12:
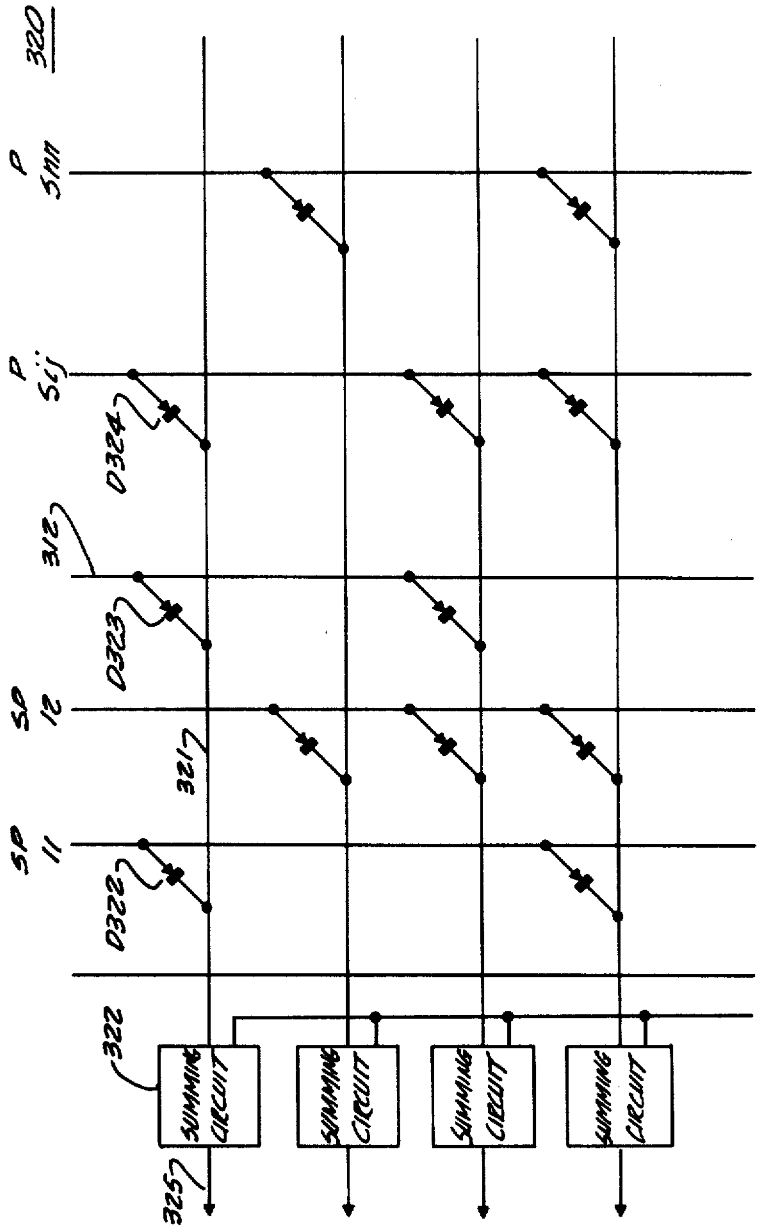

The status assessment computer 122, distance multiplier 121, and multiplexer 233 are shown in FIG. 11. Each status assessment computer is associated with a single link. Hence, one such computer may be associated with the link *ijik*. Two other such computers, generically designated link 2 and link 3, could be associated with links *kl–km* and *mn–mo*. Only the status assessment computer for the *ijik* link is shown in detail; the others are the same.

The wire 300 (FIG. 11) connects to the wire 300 of FIG. 9. Thus, the voltages fed into FIG. 11 are proportional to the original status reports received over the north going links modified in the variable connectivity weighting computer 263 to reflect the connectivity of the appropriate node. The wire 300 is connected through a gate 301 which is substantially the same as the receive gate 270. This gate is made conductive during the appropriate time slot by a local clock 302 which runs on a transmitting time base under control of a system synchronizing device 303.

The voltage received over wire 300 is modified by the distance weighting computer which is the same as that described in FIG. 10.

Upon reflection, it should be apparent that successive signals received over wire 260 (FIG. 9) represent the north node's assessment about the status of links *i,j–i,k*; *k,l–k,m*; *m,n–m,o*; etc. Each signal can be considered the voltage $E_1$ of FIG. 10 which is supplied to the connectivity weighting multiplier 265 (FIG. 9) where it is converted to the weighted signal $E_2$ (FIG. 10). Then, the voltage $E_2$ is applied to the distance weighting multiplier 121 (FIG. 11) to provide the voltage $E_3$ which is applied to a bus 305 and stored on a capacitor 306. This voltage is the local assessment of information about the status of link *i,j–i,k*, according to a report received from the node at the north. At the same time, assessments are made at 122*a* and 122*b* about the same link *i,j–i,k*, according to reports received from the east and south nodes. Therefore, three separate voltages are applied to bus 305 and the resultant is stored on the capacitor 306.

Voltage signals corresponding to a given transmitting link are transferred through the gate 301, at a time determined by the transmitting local clock 302, to the summing bus 305. The pulses on the summing bus are multiplexed at 233 by an outgoing gate 307 for transmission over the outgoing link order wires. This multiplexing occurs in response to outgoing and receiving gate pulses which are a factor of the length summing gate pulses. By a choice of time base, the probability of simultaneous reception and transmission of status pulses is minimized. If the pulse repetition rate is as suggested previously, four frames per second, the frame interval is .25 second. For a thirty-two link network, the interval between channel pulses is $$\frac{.25}{32}$$

or 8 milliseconds. For an interference probability of less than $1 \times 10^{-3}$, the gates should be conductive less than 5 milliseconds.

The voltage pulses corresponding to the status of link *i,j–i,k* are received over order wires (FIGS. 2 and 8) and transferred to the link *i,j–i,k* summing bus 305. The status assessments charge the capacitor 306 to a voltage which is positive, negative or indeterminate. The outputs of the receiving gates of the other links are also transferred to summing buses 309, 510, etc.

The outputs of the status assessment summing capacitors (such as 306) are transferred to the route finding computer 125 over conductor 311, to the connectivity computer 120 over conductor 312 and to the local display over conductor 313 through appropriate high impedance amplifiers (not shown) to avoid disturbing store on 306. These outputs represent the assessment by the computer at the local node of the status of the network at that instant of time. The assessment is computed at the frame rate, and a new status message transmitted back into the network over the outgoing order wires. Although the assessment of the status of a particular link may be in error at one instant, this error will be corrected quickly.

The connectivity weighting computer uses a rectangular switching matrix 320 (FIG. 12) in which the rows represent the reporting node order wires and the columns represent the link connecting reporting nodes. Each vertical multiple, such as 312, of this matrix 320 connects to a summing bus of the status assessment computer. Each horizontal multiple, such as 321, connects to a current summing circuit 322. The summing circuits produce a current which is proportional to the number of connections available to the reporting node multiplied by the reciprocal of the initial average connectivity. For example, three diodes 322, 323 and 324 connect vertical multiples to the horizontal multiple 321; therefore, the circuit 322 sends a signal over wire 325 indicating a connectivity of "three." The output of the summing circuit 322 connects to the connectivity multiplier at 325 in FIG. 9. This is the output which is used to alter the instantaneous resistive value of the variable resistor 285.

Means are provided for finding the shortest available path through the switching system. For this, see FIG. 13 which is divided into three parts; the route finding matrix 125, a route coding matrix 250 and a selector circuit 330.

The route finding matrix 125 is a replica or model of the actual switching network which shows every node and link in the system. One mode 331 or *i,j* called the "reference node" is permanently marked with a ground potential via wire 332 to indicate that it represents the local node where the computer under discussion is located.

Figure 13:
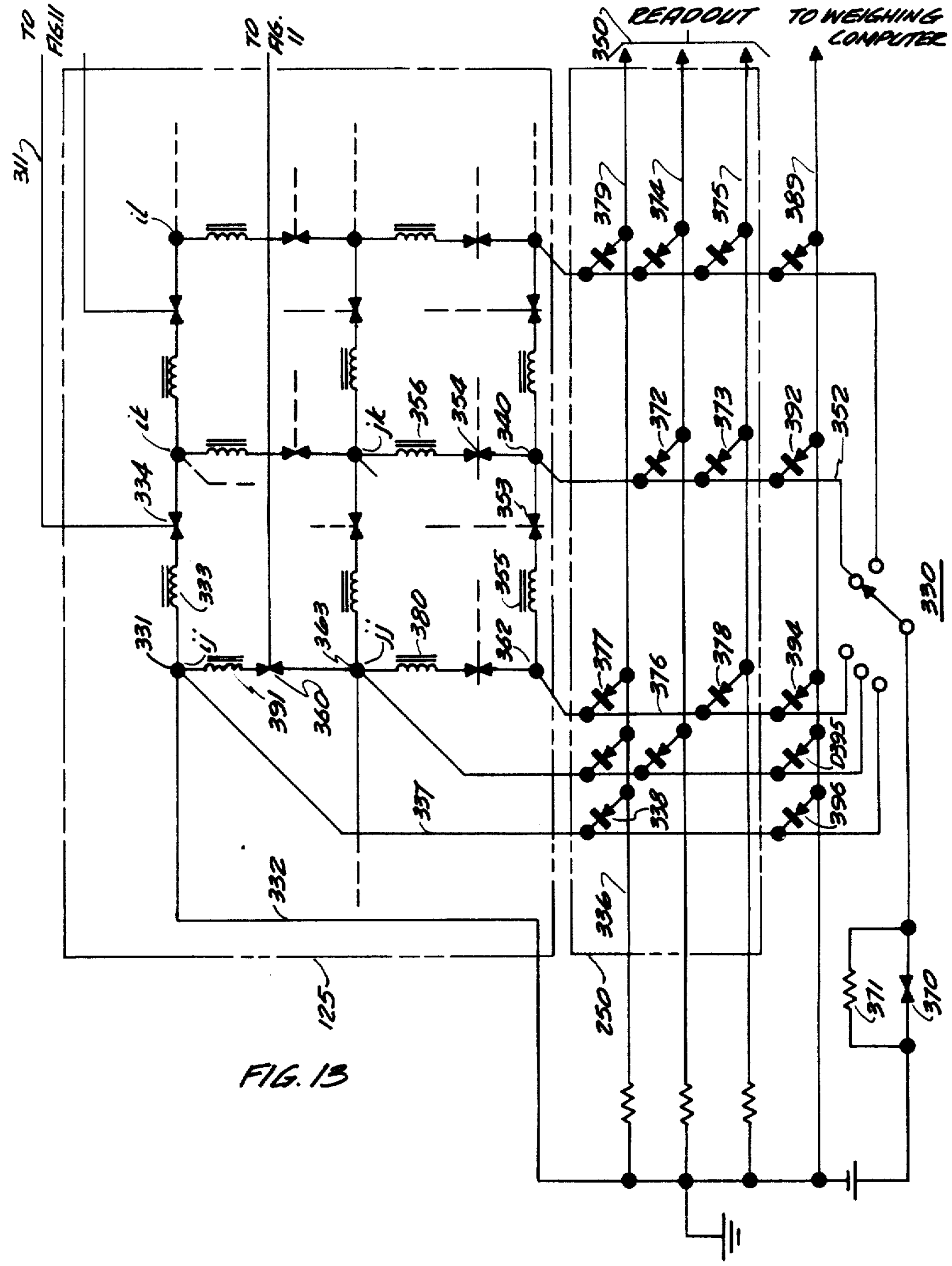

The network nodes of FIG. 13 are interconnected by link simulations which are represented by a delay line (such as 333) and an inhibitable switch (such as 334). Conveniently, this switch may be a silicon controlled rectifier (SCR). By way of example, the delay line 333 and SCR 334 could represent an out of service link *i,j–i,k* (FIG. 11). Since this link is unavailable, the potentials on capacitor 306 (FIG. 11) is negative, thereby representing a considered judgment that the link *i,j–i,k* must not be used. Hence the potential on conductor 311 is negative and inhibits SCR diode 334 to keep it from turning on. From FIGS. 9 and 11, we see that the inhibiting potential appears on the controllable switches of FIG. 13 whenever the weights given to the received status reports add or subtract to make the potential on a summing bus (such as 305 in FIG. 11) equal to an SCR inhibiting potential.

The route coding matrix 250 is a coordinate array of horizontal and vertical buses, such as 336 and 337. Diodes are selectively connected at the crosspoints of these buses to give a binary coded output signal which identifies a corresponding node. For example, diode 338 interconnects buses 336 and 337 at the intersection thereof. Thus, if bus 337 is marked, a pulse passes through diode 338 to energize the bus 336. Obviously, therefore, the reference node 331 is identified at read-out 350 by a binary code of 1,0,0. In like manner, every vertical bus and therefore every other node is identified by a uniquely coded set of readout pulses which appear on buses 379, 374 and 375 at 350 when the corresponding vertical is marked.

The selector switch 330 may be any type of device which can select a given vertical responsive to requests from the switching center common control.

The circuit of FIG. 13 operates in the following way. Assume that a subscriber at a station in the reference node 331 has dialed the directory number of a subscriber in node 340. Assume further that the conductor 311 is marked from FIG. 11 with a potential which inhibits the diode 334 because link *i,j–i,k* is out of service. Responsive to the dialed digits, the switch 330 is set to the position shown in the drawing in any suitable manner. This sends a potential (opposite in polarity to the potential that permanently marks reference node 331) up bus 352 to the node point 340. The identity of the node 340 is read out at 350 as the binary code 0,1,1. The diodes 353 and 354 fire immediately and the potential on bus 352 is delayed by the delay lines 355 and 356. In like manner, a diode fires in each link replica. Since the SCR diode 334 is inhibited by the potential on bus 311, a path cannot fire through this part of the network. The SCR diode 360 is not inhibited; therefore, the path through the replica network is forced up the link *j,j–i,j* and prevented from passing over link *i,j–i,k*.

The established route, i.e. that path which first breaks down between the two end-marked nodes 331 and 340 may include the nodes 340, 362, 363 and 331, for example. The chances of a simultaneous completion of two parallel paths through the replica network is extremely slight because component characteristics will vary enough to allow one path to win a race. Moreover, even though the idealized network of FIG. 13 shows equal length paths through a rectangular grid, it is extremely unlikely that a real life network would have such an idealized symmetry. Rather, one path would almost certainly be shorter than another path, and it would be completed first. Current then flows over the completed path to latch and hold the SCR diodes in that path. The SCR diodes in all competing paths are then starved and switched "off" due to lack of current.

An interrogation pulse is then sent through the route finding matrix 250. The pulse occurs when contacts through SCR 370 opens and closes for a period of time which is much shorter than the delay time of a delay line.

The resistor 371 provides a minimum current flow which holds "on" the SCR diodes in the completed path while contacts at 370 are open.

The interrogation pulse travels up bus 352 (selected by switch 330) and gives two read out pulses via diodes 372 and 373 to horizontal buses 374 and 375. A moment later, after the delay in delay line 355, the pulse travels down vertical bus 376 and gives two read out pulses, via diodes 377 and 378 to horizontal buses 379 and 375. Then, there is another relay in line 380. In this way, successive sets of coded read out signals appear at 350 to identify each node in the selected path.

Equipment (not shown), but connected to the READ OUT conductors 350, detect and decode these pulses as they appear. The decoded signals are then used to generate routing command and display signals.

Figure 14:
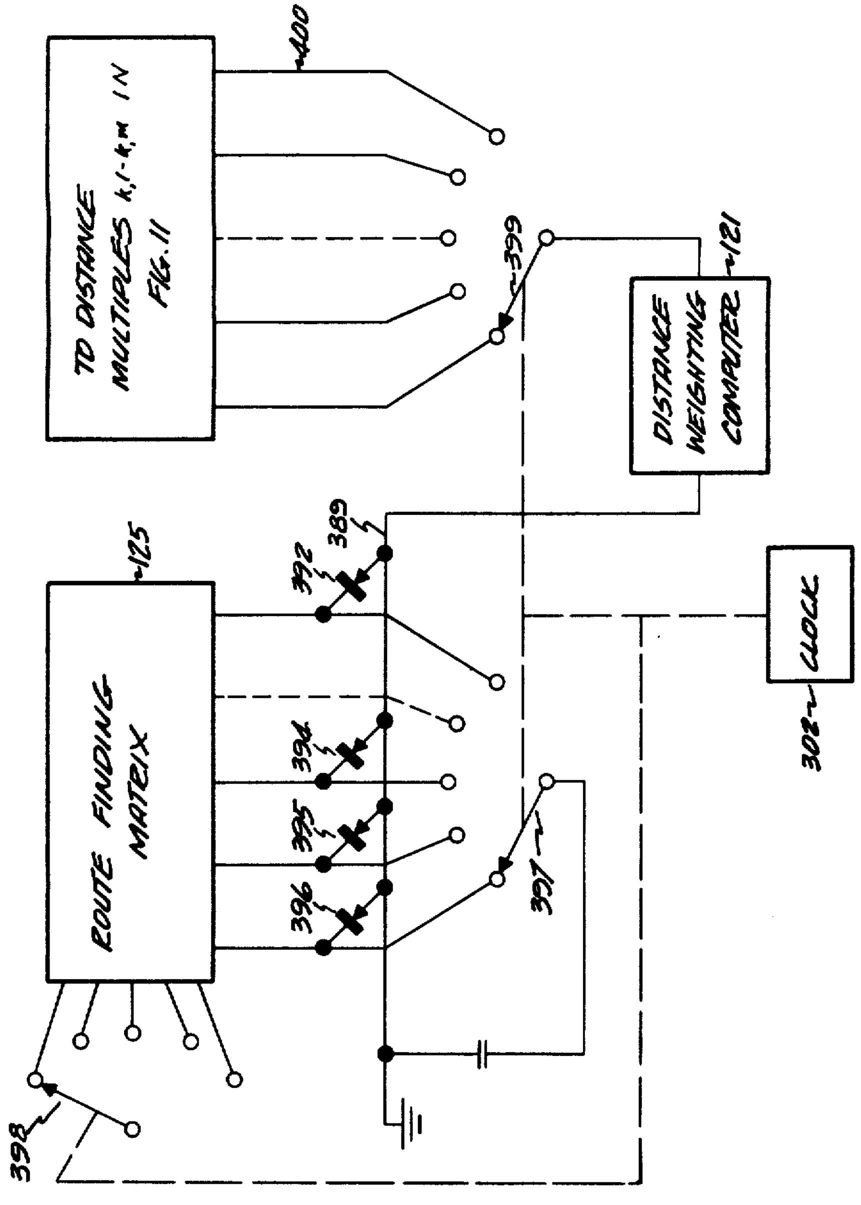

The distance weighting computer as shown in FIG. 14 is composed of a route finding matrix similar to that of FIG. 13. This may be the same matrix that is used to find the desired path. Or it may be another, duplicate matrix, depending upon the system needs. This computer is used to measure the distance from each reporting node to every other node, in terms of the total number of nodes in a path.

The weighting computer 121 is connected to the conductor 389 which, in turn, is diode coupled to every vertical in the route coding matrix 250, as indicated in FIG. 13 as well as FIG. 14. Hence, in the assumed example of a path from the node 340 to 331 the output on conductor 389 appears in the form of four output pulses. The first pulse occurs when contacts 370 (FIG. 13) open. The next three pulses are separated by the delays of the delay lines 355, 380 and 391. These pulses pass through the diodes 392, 394, 395 and 396. In this way, the distance weighting computer 121 may discover the distance between any two nodes by the expedient of setting the switches 397, 398 and 399 to select the two nodes. The weighting computer 221 counts the pulses as they appear on conductor 389. Responsive thereto, the variable resistor 286 (FIG. 10B) is set to give the correct weighting factor. Finally, all pulsing can be accomplished under the control of clock 302 so that the distance is measured during the interval while the status reports are received.

The route finding computer (FIG. 13), and weighting computer (FIGS. 12 and 14) can be designated as pure digital computers with an order of a tenfold finer resolution. Therefore, the question is what resolution does the function require?

In the status assessment computer, the most sensitive computation occurs in the summing of the weighted estimate of a given route condition. If the basic estimates are two valued, and the maximum distance is seven nodes, we may have to resolve at the worst the following difference $$=\{e_i^k+1,(g'h')\}\{w_{i+1}^{pd2}\}\{w_{i+1}^{pc1}\}+\{e_{i-1}^k(gh)\}\{w_{i-1}^{pd2}\}\{w_{i+1}^{pc1}\}$$

If the worst values are of the following order $$A=(+1)(1/7^2)(2/3)+(-1)(1/6^2)(1/3)$$

then the difference is $$\Delta=2/147-1/108\cong 4/300-3/300=1/300=1/3 \text{ of } 1\%$$

The judgment of an analog system would be to call =0 (indeterminate). The simulations show that generally this decision will merely delay the computation by one cycle. A more common difference in medium to large networks is $$\Delta=(+1)(1/5^2)(1/3)+(-1)(1/4^2)(2/3)$$
$$=1/75-2/48\cong 2/150-6/150=\div 4/150\cong\div 3.6\%$$

which is a difference that is within the resolution capability of an analog computer and one which will be discriminated as an unequivocal estimate. However, if the status matrix were not two valued (±1), but say, consisted of four value levels of −1, .25, .75, and 1, differences of the following form may accumulate $$\Delta=(-1)(1/5^2)(1/3)+(+.75)(1/4^2)(2/3)$$
$$=1/25-2/48=$$
$$\Delta=(.75)(1/5^2)(2/3)+(1)(1/4^2)(1/3)$$
$$\cong 1/50-1/48=.02\div 0208$$
$$=.0008$$

Under such circumstances, an analog system could proceed to an increasing state of indeterminacy, and the processing herein described would have to be executed by means of appropriate digital computers of greater complexity and cost, which is of course in no way precluded by the present embodiment of the system.

These observations are of importance to indicate factors which must be considered when a system is designed. The relative position of a computer in the hierarchy of a comprehensive network monitor and control system will dictate the resolution that is required. Information is an exponentially growing tree. If a link becomes unavailable, the questions asked of the computer are a function of the level of surveillance, i.e. global, and local. If all detail data is circulated everywhere continuously, a clear danger arises that the network will be congested not by user traffic, but by information about the network. Thus, monitor and control systems must be stacked under each other, in the rank of their resolution detail and executive interest. The uppermost or global level should be confined to the most basic information necessary to permit localization and sequential interrogation to identify links which become unavailable. The following interrogation for more detail can then be addressed to the link terminating monitor and control system without a redundancy loading of the entire network. This way, only the local level receives the great masses of information which may be irrelevant to all but a local level of the control and maintenance organization.

While the principles of the invention have been described above in connection with specific apparatus and applications, it is to be understood that this description is made only by way of example and not as a limitation on the scope of the invention.

We claim:

1. A status report computer distributed throughout a switching network of nodes interconnected by traffic carrying links, means at each of the nodes in the network for reporting the status of said links, means for weighting and then repeating the status reports which are received from adjacent nodes concerning the status of said links, means comprising at least one transmission channel for transmitting such reports in a manner which identifies the reporting nodes, and means comprising a computer in each of said nodes for receiving and weighting the status reports circulated via said channel according to pre-established credibility indicating criteria.

2. The computer of claim 1 and means for commanding the switching network to undertake an appropriate routing of traffic through said network.

3. The computer of claim 1 wherein said transmission channel comprises a time division multiplex highway, means for transmitting over said channel a flow of signals giving a continually modified assessment of the network status, said signals being multiplexed into time frames which identify the links that are the subject of the report, means at each node comprising a status assessment computer for receiving said flow of signals, remembering what has occurred in the past, and noting changes from the remembered history, means comprising a computer for weighting each said change according to the nearness of the network change and the connectivity of the reporting node, and means for relaying a new assessment of the status of the network as modified by the weighting.

4. The computer of claim 1 and means for relaying the news of a network change in concentric waves radiating outwardly from the point of change, and means for weighting the news according to the credibility of the reporting node.

5. The computer of claim 1 wherein the nodes are telephone switching centers and the links are telephone communication channels interconnecting the centers.

6. The computer of claim 5 wherein the reporting means at each node comprises a limited capacity data processing computer, and means associated with each node computer for making a switch path decision at that node based upon a weighted assessment of informational data circulating through said network.

7. The computer of claim 1 and means for sensing network conditions, said weighting means comprising means for weighting said sensed conditions in accordance with the distance between the reporting sensor and the assessing computer.

8. The computer of claim 1 and means for weighting said status reports in accordance with the number of nodes connecting to the reporting node.

9. The computer of claim 1 and a closed feedback loop for modifying switch operations according to the weighted status reports.

10. The computer of claim 2 wherein said computer at each of the nodes comprises a plurality of gating circuits and local summing busses, a control clock, means responsive to said clock for substantially simultaneously opening a plurality of the gates to transmit a plurality of voltage signals from reporting nodes to said summing bus during time frames which identify the node that is the subject matter of the status report, whereby all of the voltage signals add or subtract on the summing bus, and means for routing traffic through said network responsive to the sums of said voltage signals.

11. The computer of claim 10 and a model of said network comprising a plurality of inhibitable devices representing said links, said devices being connected to said summing busses, means responsive to said sums of said voltage signals for selectively inhibiting said devices when a link is unavailable, means for applying a pulse across a circuit in said model representing the end points of a desired switch path, and means responsive to said pulse for selecting the shortest path between said end points.

12. The computer of claim 11 wherein each of the links in said network is represented in said model by one of said devices and a delay line, and said means for selecting said shortest path is responsive to an application of said pulse to said delay line.

13. A monitoring and control circuit for a network of nodes interconnected by links, means for utilizing said nodes and links to convey traffic through said network, said network being subject to conditions of congestion, degradation, or obstruction, means comprising a statistical computer for acquiring, assessing, and communicating reports relative to the status of the links in said network, means for extending switch paths through said network on the basis of signals sent from a node originating a call, and means at every decision requiring node in said network for directing the switch path to make a particular path selection responsive to said computer's assessment of the status reports which it receives.

14. The circuit of claim 13 and a time division multiplex communication channel running through the network for transmitting a flow of signals giving a continually modified assessment of the network status, each of said links being identified by a time frame in said multiplex system, means for relaying status reports concerning a network status change during time frames on said channel which identify the point where the change occurs, said reports being sent in the form of concentric waves radiating outwardly from the point of change, and means for weighting the status reports according to the apparent credibility of the reports.

15. A status assessment computer for routing traffic through a network of nodes interconnected by traffic carrying links, computer means at each of the nodes for transmitting through said network a plurality of voltage signals representing the condition of the links in said network, means for adding or subtracting all of the voltage signals which represent the condition of a link in said network, means responsive to the sum of said voltage signals for selectively inhibiting the selection of links which cannot carry traffic through said network and means for selecting the most suitable path through uninhibited links in said network.

16. A status assessment computer to aid in routing traffic through a switching network of nodes interconnected by traffic carrying links, computer means at each of the node points comprising a plurality of local summing circuits, each of said circuits repesenting a different link in said network, means for transmitting a plurality of voltage signals through said network for reporting on the status of the links, said voltage signals being summed in a particular one of said summing circuits which corresponds to the link that is the subject matter of summed voltage signals, whereby all of the voltage signals about the subject link add or subtract a control signal for enabling or inhibiting the extension of paths through said network, means for selecting the most suitable path through enabled ones of said paths in said network, and means responsive to the selection of said shortest path for routing traffic through said network.

17. The computer of claim 16 and a model of said network comprising a plurality of delay lines and silicon rectifiers representing the links of said network, means for inhibiting said rectifiers when a link is unavailable, means for performing said inhibition responsive to said summed voltage signals, means for applying a pulse across a circuit representing the end points of a desired switch path and said means for selecting said most suitable path between said end points.

18. A status assessment computer to aid in routing traffic through a switching network of nodes interconnected by traffic carrying links, means at each of the nodes in the network for transmitting through said network reports about the status of links communicating into or out of that reporting node, said reports being in the form of voltage signals, computer means at each of the nodes comprising a plurality of gating circuits and local summing busses, means for transmitting a plurality of said voltage signals from various reporting nodes through said gates to a particular one of said summing busses which corresponds to the link that is the subject matter of the status report being transmitted while said gates conduct, whereby all of the voltage signals above the subject link add or subtract on the summing bus which corresponds to that link, a model of said network comprising a plurality of delay lines and inhibitable devices, each of said links being represented in said model by a delay line and a device connected in series, said devices being connected to be either enabled or inhibited by certain voltage on said summing busses, means for applying a pulse across a circuit in said model representing the end points of a desired switch path through said network, means responsive to said pulse for selecting the shortest path through said model by an application of said pulse to successive ones of said delay lines, and means responsive to the extension of a path through said model for routing traffic through the links in said network which are represented by the links in the selected shortest path through said model.

19. A system for controlling a switching network of nodes interconnected by links comprising a status assessment computer at each of the nodes, said computer including a plurality of gating circuits and local summing busses, means for substantially simultaneously opening a plurality of the gates to transmit a plurality of voltage signals from reporting nodes to a particular one of said summing busses which corresponds to a link that is identified by the time frames when the gates open, whereby all of the voltage signals add or subtract on said particular summing bus to provide a locally assessed status report about the link that is the subject matter of the status report, and means for routing traffic through the node where said computer is located responsive to the locally assessed status report.

20. The system of claim 19 wherein said computer comprises a model of said network having a plurality of interconnected inhibitable devices representing said links, said devices being connected to be enabled or inhibited by voltages on said summing busses, means responsive to said sums of said voltage signals for selectively inhibiting said devices when a link is unavailable, means for applying a pulse across said model at terminals representing the end nodes of a desired switch path, and means responsive to said pulse for selecting the shortest path through enabled devices connected between said end points.

21. The system of claim 20 wherein each of the links in said model of the network comprises one of said devices and a delay line, and said means for selecting said shortest path is controlled responsive to an application of said pulse to successive ones of said delay lines.

22. The system of claim 21 and means comprising an encoding matrix coupled to said model so that every node in said model is identified by a series of differently coded pulses, and means for sending an interrogation pulse down the delay line formed by said shortest path, whereby said encoding matrix reads out the identity of every node in the shortest path through said network as said pulse passes the corresponding node points in said model.

23. A device for selecting a switch path through a matrix of nodes interconnected by links comprising a model of said matrix wherein said links are represented by delay lines and inhibitable self-firing electronic switches, means for end marking said model to designate the terminus of a desired switch path through said network, the marking on one of said end points being a pulse which is shorter than the delay in said delay lines, whereby said pulse runs through said model firing uninhibited ones of said electronic devices and thereby selecting the shortest path between said end points, and means for identifying the nodes in said model to enable the completion of a path through corresponding nodes in said network.

24. A status assessment and route finding computer distributed throughout a switching network of nodes interconnected by traffic carrying links comprising, means at each of the nodes in the network for transmitting signals reporting the status of the network as assessed by that node, means at each of the nodes for receiving status report signals concerning the network status as assessed by the adjacent nodes, means comprising at least one transmission channel for transmitting such signals in a manner which identifies the reporting node, means comprising a computer in each of said nodes for receiving and weighting the status reports on each link of the network circulated via said channel, the link status reports received from said adjacent nodes being weighted according to pre-established credibility indicating criteria, and means for providing the switching network with an appropriate route for the transmission of traffic through said network.

25. The computer of claim 1 wherein said transmission channel comprises a time division multiplex highway, means for transmitting over said channel a flow of said signals giving a continually modified history of the network status, said signals being multiplexed into time frames with time slots to identify each link in the network, said computer at each node comprising a status assessment computer for receiving this flow of signals representing the network status, said status assessment computer incorporating means for storing a memory of received signals, means for noting a change from one received signal to the next, and means for weighting the reports of said change according to the nearness of the network change from the reporting node and the connectivity of said reporting node, and means for relaying a new assessment of the status of the network reporting nodes capability as modified by said weighting.

References Cited

UNITED STATES PATENTS

| | | | |
|---|---|---|---|
| 3,238,506 | 1/1966 | Jung et al. | 340—172.5 |
| 3,287,703 | 11/1966 | Slotnick | 340—172.5 |

PAUL J. HENON, *Primary Examiner.*

R. B. ZACHE, *Assistant Examiner.*